(12) United States Patent
Powell et al.

(10) Patent No.: US 9,798,154 B2
(45) Date of Patent: Oct. 24, 2017

(54) CONTROL OF POLARIZATION AND DIFFRACTIVE ARTIFACT RESOLUTION IN RETRO-IMAGING SYSTEMS

(71) Applicant: Microsoft Technology Licensing, LLC, Redmond, WA (US)

(72) Inventors: Karlton Powell, Lake Stevens, WA (US); Tim Large, Seattle, WA (US); Yutaka Tokuda, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 14/588,792

(22) Filed: Jan. 2, 2015

(65) Prior Publication Data
US 2015/0248014 A1   Sep. 3, 2015

Related U.S. Application Data

(60) Provisional application No. 61/946,651, filed on Feb. 28, 2014.

(51) Int. Cl.
*G02B 27/22* (2006.01)
*G02B 3/00* (2006.01)
(Continued)

(52) U.S. Cl.
CPC ....... *G02B 27/2292* (2013.01); *G02B 3/0006* (2013.01); *G02B 5/124* (2013.01);
(Continued)

(58) Field of Classification Search
CPC ................ G02B 27/2292; G02B 5/124; G02F 2001/13345; G02F 2001/133541; G02F 1/1334
See application file for complete search history.

(56) References Cited

U.S. PATENT DOCUMENTS 3,753,608 A   8/1973   Bernal
5,572,363 A   11/1996   Fergason
(Continued)

FOREIGN PATENT DOCUMENTS

EP   0460873 A1   12/1991
FR   2133588 A1   12/1972
(Continued)

OTHER PUBLICATIONS

"Second Written Opinion Issued in PCT Application No. PCT/US2015/017624", dated Oct. 7, 2015, 8 Pages.
(Continued)

*Primary Examiner* — Paul Lee
(74) *Attorney, Agent, or Firm* — Turk IP Law, LLC

(57) ABSTRACT

Polarization state in retro-reflective arrays may be controlled throughout the optical path of a retro-reflective retro-imaging setup to enhance system efficiency. A polarization beam splitter layer and a retarder layer placed in front of the retro-reflector array may be oriented such that polarized light is used as source, source input light is efficiently reflected at the polarization beam splitter layer toward the retro-reflective layer, and polarization is converted to circular upon first pass through retarder layer. The polarization may also be oriented at or near 45° with respect to input polarization state, light may be retro-reflected and reconverged at the retro-reflective layer, and converted to linear polarization state. The light may then be rotated about 90° with respect to input linear state, and/or passed through the polarization beam splitter layer upon second pass to form the reconvergent image.

13 Claims, 22 Drawing Sheets

(51) Int. Cl.
*G02B 5/124* (2006.01)
*G02F 1/1334* (2006.01)
*G02B 5/30* (2006.01)
*G02B 27/26* (2006.01)
*G02B 27/28* (2006.01)
*G02F 1/1335* (2006.01)
*G02B 27/18* (2006.01)

(52) U.S. Cl.
CPC ........... *G02B 5/3083* (2013.01); *G02B 27/18* (2013.01); *G02B 27/26* (2013.01); *G02B 27/283* (2013.01); *G02B 27/288* (2013.01); *G02F 1/1334* (2013.01); *G02F 1/133528* (2013.01); *G02F 2001/13345* (2013.01); *G02F 2001/13355* (2013.01); *G02F 2001/133541* (2013.01); *Y10T 29/52* (2015.01)

(56) References Cited

U.S. PATENT DOCUMENTS

| | | | |
|---|---|---|---|
| 5,629,806 A | 5/1997 | Fergason | |
| 6,184,944 B1* | 2/2001 | Stephens | G02B 1/06 349/5 |
| 6,198,523 B1* | 3/2001 | Helbing | G02B 5/3025 345/101 |
| 6,233,084 B1* | 5/2001 | Owen | G02F 1/13363 348/E5.141 |
| 6,243,065 B1* | 6/2001 | Robrish | G02F 1/13362 345/97 |
| 6,323,999 B1 | 11/2001 | Ueda et al. | |
| 6,490,104 B1 | 12/2002 | Gleckman et al. | |
| 6,498,632 B1* | 12/2002 | Butterworth | G02F 1/13471 348/E9.027 |
| 7,254,288 B2 | 8/2007 | Kalibjian | |
| 2004/0240059 A1* | 12/2004 | Li | G02B 6/4298 359/489.11 |
| 2005/0264883 A1 | 12/2005 | Zhu | |
| 2007/0139952 A1* | 6/2007 | Tsai | G02B 6/0046 362/561 |
| 2009/0073543 A1* | 3/2009 | Pannell | G02F 1/11 359/305 |
| 2010/0177402 A1 | 7/2010 | Maekawa | |
| 2010/0253915 A1 | 10/2010 | Gao et al. | |
| 2013/0135722 A1 | 5/2013 | Yokoyama | |

FOREIGN PATENT DOCUMENTS

| | | |
|---|---|---|
| GB | 2292248 A | 2/1996 |
| WO | 8303019 A1 | 9/1983 |
| WO | 9425899 A1 | 11/1994 |
| WO | 2008089417 A2 | 7/2008 |

OTHER PUBLICATIONS

"International Preliminary Report on Patentability Issued in PCT Application No. PCT/US2015/017624", dated Jan. 27, 2016, 9 Pages.

"International Search Report and Written Opinion Issued in PCT Patent Application No. PCT/US2015/017624", dated May 4, 2015, 13 Pages.

Sakamoto, et al., "Parallax Polarizer Barrier Stereoscopic 3D Display Systems", In Proceedings of the International Conference on Active Media Technology, May 19, 2005, pp. 469-474.

* cited by examiner

CONTROL OF POLARIZATION AND DIFFRACTIVE ARTIFACT RESOLUTION IN RETRO-IMAGING SYSTEMS

CROSS-RELATED APPLICATIONS

This Application is non-provisional of U.S. Provisional Patent Application Ser. No. 61/946,651 filed on Feb. 28, 2014, by the same inventors, commonly assigned herein. The disclosure of the U.S. Provisional Patent Application is hereby incorporated by reference in its entirety.

DETAILED DESCRIPTION

According to some implementations, use of uncoated or coated retro-reflective arrays may be enabled and efficiency of a polarization based system increased, while avoiding additional losses in resolution. Polarization state may be controlled throughout the optical path of a retro-reflective retro-imaging setup to enhance system efficiency. For example, linear polarized input light from a display module may be used in conjunction with a polarization beam splitter and a retarder placed in front of the retro-reflector array. The layers may be oriented such that polarized light is used as source, source input light is efficiently reflected at the splitter toward the retro-reflective layer, polarization is converted to circular upon first pass through retarder layer, oriented at or near 45° with respect to input polarization state, light is retro-reflected and reconverged at the retro-reflective layer, reflected light is converted to linear polarization state and rotated 90° with respect to input linear state, and/or passed through splitter upon second pass to form reconvergent image.

In other implementations, metallized coated second-surface retro-reflective arrays may be employed without impact on resolve. Uncoated second-surface retro-reflective arrays may avoid coating challenges, but may involve suitable correction of phase through a retardance layer in polarization state control systems to avoid impact on resolution of floating image, as described herein. By controlling polarization, such uncoated retro-reflector arrays may be used in a polarization based system without additional impact on resolution beyond the fundamental limitations due to facet angle error alone. In yet other implementations, two orthogonal polarization states at source display may be used to achieve simultaneous viewing of both floating image and direct view of display panel. Thus, retardance-based stereo type liquid crystal display (LCD) modules may be employed.

These and other features will be apparent from a reading of the following description and a review of the associated drawings. In the following description, references are made to the accompanying drawings that form a part hereof, and in which are shown by way of illustrations, specific implementations, or examples. These aspects may be combined, other aspects may be utilized, and structural changes may be made without departing from the spirit or scope of the present disclosure. The following description is therefore not to be taken in a limiting sense.

Figure 1:
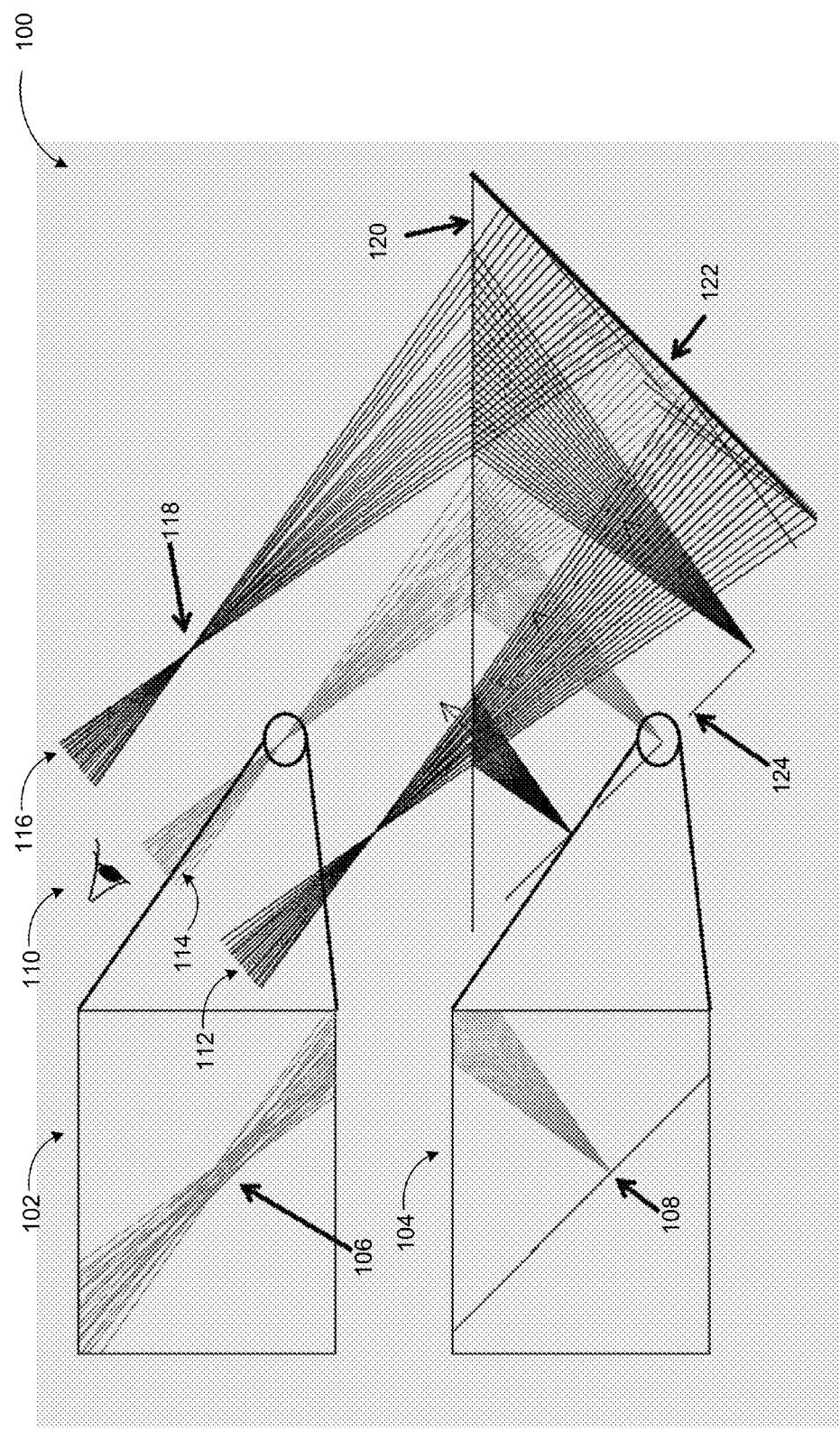
FIG. 1 illustrates a formation of a reconvergent floating image in a retro-reflective display system.

FIG. 1 illustrates a formation of a reconvergent floating image in a retro-reflective display system.

Diagram 100 shows one type of imaging system that is capable of forming a real floating image along with large viewing volume or eye box. A retro-imaging system may provide the floating image using a source object light 108 (shown in expanded portion 104, which illustrates an expanded view of source object light 108 on plane 124), a half-mirror (beam splitter 120), and a retro-reflective array 122. In such a system, the source object light 108 may be partially reflected by the beam splitter 120 toward the retro-reflective array 122. The retro-reflective array 122, which may include a plurality of corner cube reflectors (also referred to as corner cube array "CCA"), may reflect that light in such manner that it is reconvergent (118). A portion of that light may transmit through the half-mirror upon second pass, forming the reconvergent image 118, which may be a 'floating' replica of the source light. The floating replica may be formed from 2D or 3D objects.

In the example system of diagram 100, three source lights are used arriving as components 112, 114, and 116 at the viewer's eye 110. These components may be red, green, blue, for example, as basic components of an RGB color system. The source lights may be on a plane 124 that may be described as the source plane, display plane, or object plane depending on the configuration of the system.

Because the light path in a system as described herein includes light emission from object, first pass light reflected by beam splitter, light reflected by retro-reflective array, second pass light transmitted through beam splitter, and formation of the reconvergent image, the system efficiency may suffer from at least half the light energy being lost at each of the two interactions with the beam splitter, and any additional loss associated with the retro-reflective layer. As such, a typical retro-reflective imaging system may be less than 25% efficient.

According to some implementations, polarization state in retro-reflective arrays may be controlled throughout the optical path of a retro-reflective retro-imaging setup to enhance system efficiency. A polarization beam splitter layer and a retarder layer placed in front of the retro-reflector array may be oriented such that polarized light is used as source, source input light is efficiently reflected at the polarization beam splitter layer toward the retro-reflective layer, and polarization is converted to circular upon first pass through retarder layer. The polarization may also be oriented at or near 45° with respect to input polarization state, light may be retro-reflected and reconverged at the retro-reflective layer, and converted to linear polarization state. The light may then be rotated about 90° with respect to input linear state, and/or passed through the polarization beam splitter layer upon second pass to form the reconvergent image. In other implementations, metallized coated second-surface retro-reflective arrays may be employed without impact on resolve. In yet other implementations, two orthogonal polarization states at source display may be used to achieve simultaneous viewing of both floating image and direct view of display panel.

While configurations with the PBS layer at or near 45° to the retro-reflective layer are used as example configurations herein, a range of angles (for example, on order of +/−5° to 10°) deviation from 45° may provide similar functionality. Many retro-reflective films may have performance that may diminish due to diffraction versus angle when viewed off-normal incidence. Thus, depending on a position of the viewer, a type of retro-reflective material, and other factors, angles other than 45° may also be used.

Figure 2A:
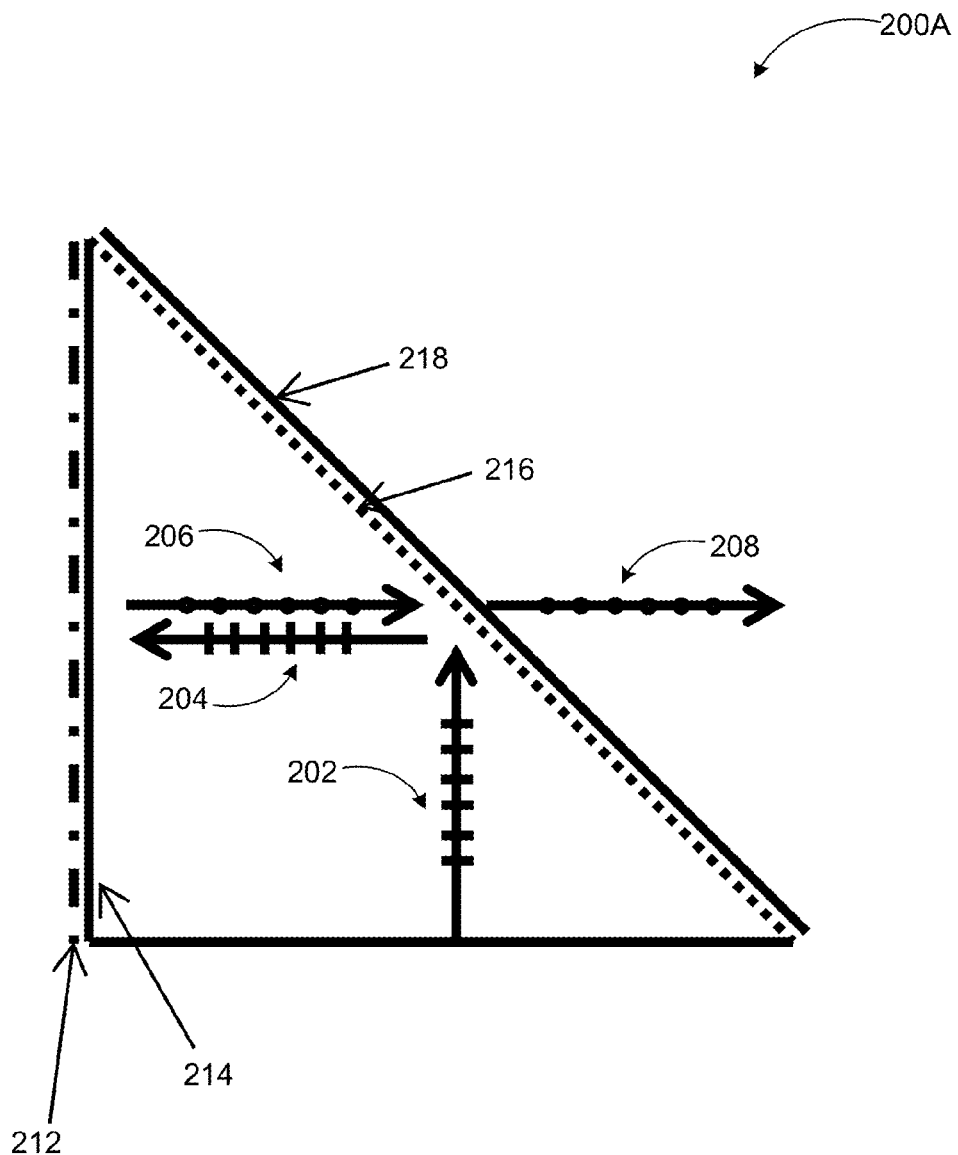
FIGS. 2A through 2C illustrate example formations of a reconvergent floating images according to different implementations.
Figure 2B:
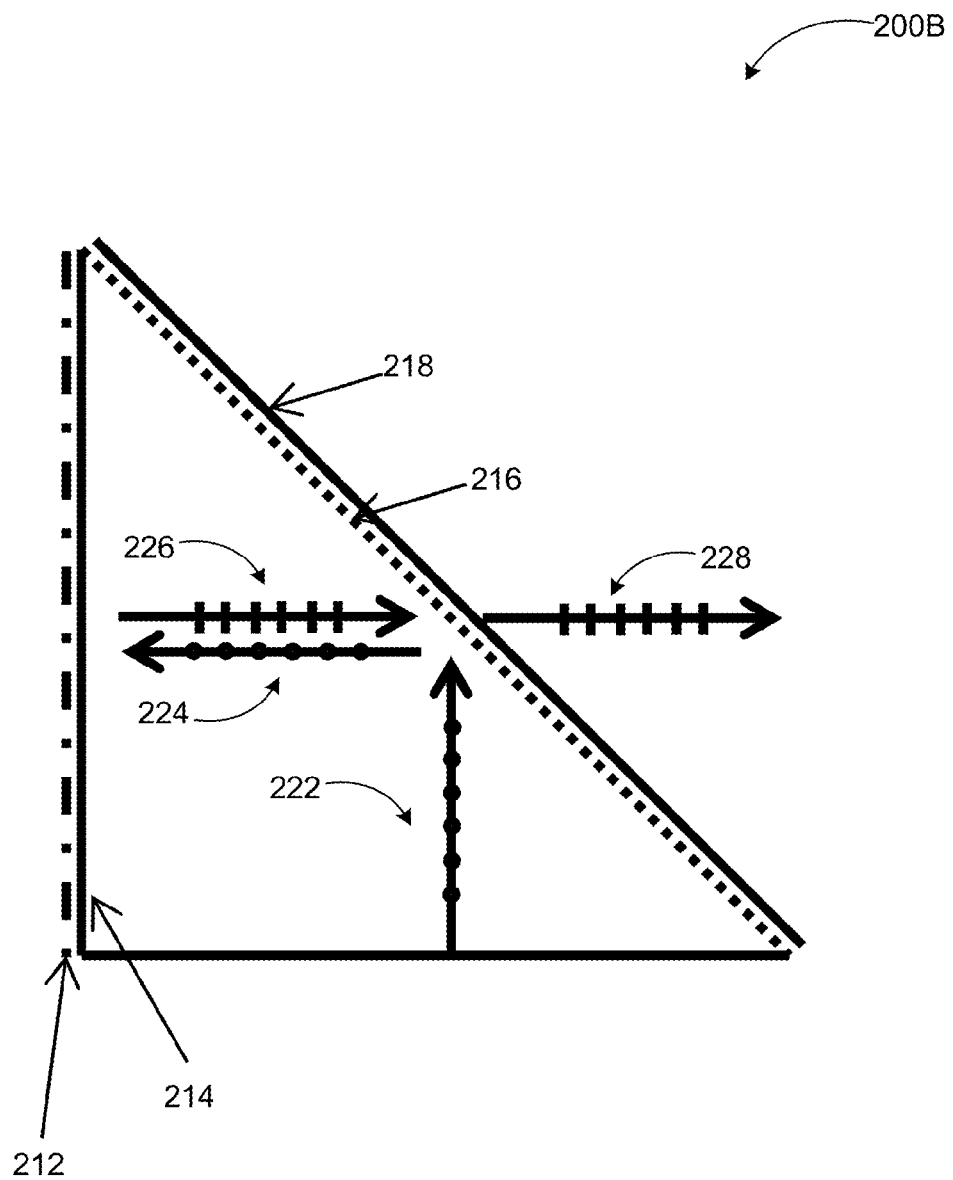
Figure 2C:
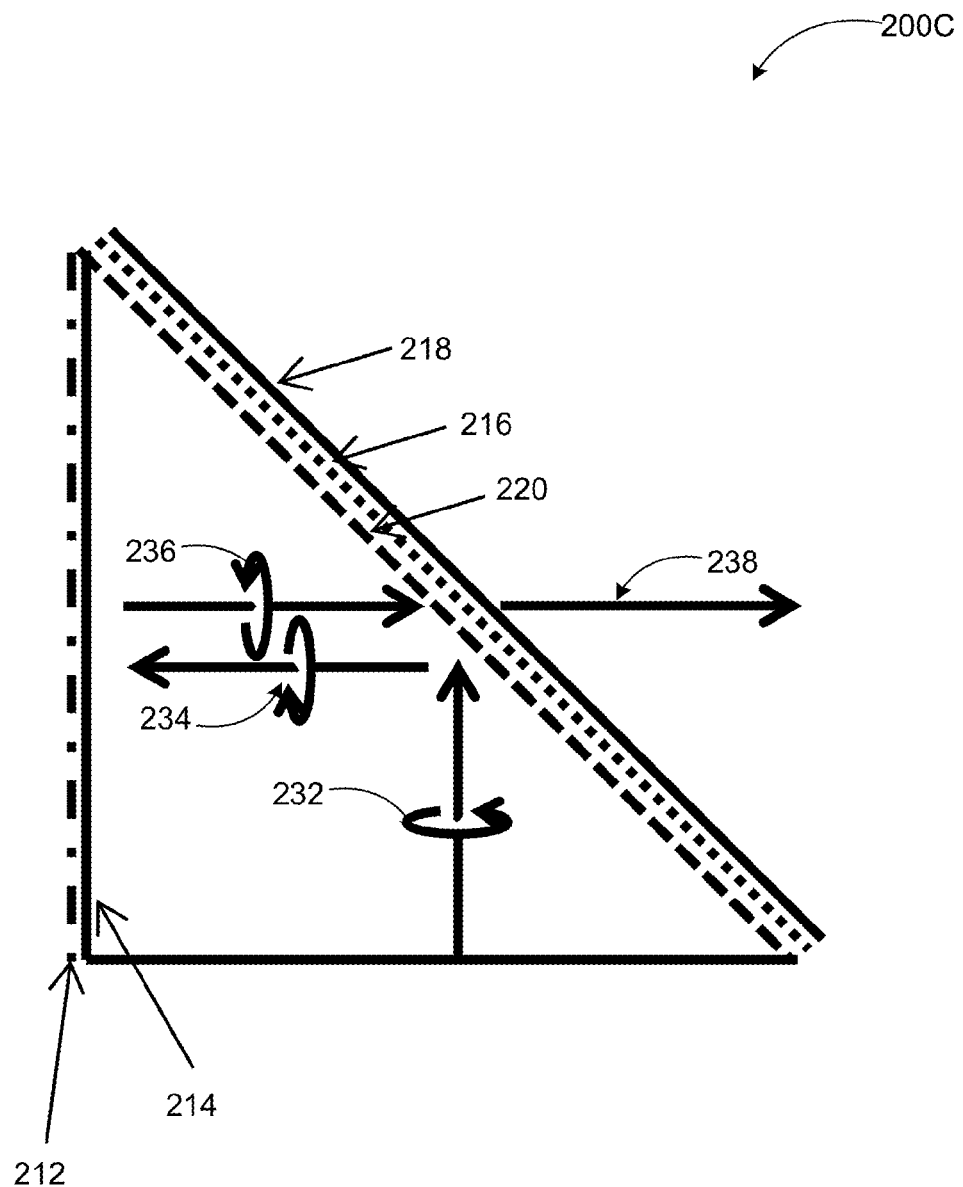

FIG. 2A through 2C illustrate example formations of a reconvergent floating images according to different implementations.

In a system according implementations, a source input light may be changed from random polarization to linear polarized in order to avoid efficiency losses for each of the two passes of the source light through the beam splitter. Further, by replacing the half mirror with a polarization sensitive beam splitter, the input light polarization state may be chosen so as to be substantially reflected at the first encounter of the beam splitter. In other implementations, a retarder layer may be introduced just before the retro-reflector, such as by using a quarter-wave film as the substrate or laminated in front of the array, and the linear polarized light may be converted into circular as it illuminates the retro-reflector array. The circularly polarized light may then be converted back to linear polarization upon a second pass, but be orthogonal to the input polarization state. The converted state may enable the light to not only begin to reconverge from the array, but also be able to pass through the beam splitter on the second pass at the beam splitter or 'selective' mirror, enabling the light to more efficiently form the reconvergent image. Various orthogonal states may be used in the system to achieve a similar effect.

In diagram 200A of FIG. 2A, linearly polarized input light beam 202 is efficiently reflected (shown as light beam 204) toward the retro-reflective layer 212 by the aligned polarization beam splitter (PBS) layer 216, and converted to circular polarization by the first pass through the quarter-wave retarder layer 214. The circularly polarized and retro-reflected light beam may be converted from circular to linear polarization, which is rotated 90° compared to input state, upon second pass through the quarter-wave retarder layer 214 and reach the PBS layer as light beam 206. The reconvergent light (light beam 206) may transmit through the PBS layer 216 and the polarizer filter 218 (light beam 208).

In diagram 200B of FIG. 2B, the retro-reflective layer 212, the quarter-wave retarder layer 214, the PBS layer 216, and the polarizer filter 218 function substantially similarly as in diagram 200A. The source light beam 222 is linearly polarized, but rotated 90° compared to the example of FIG. 2A. The reflected light beam 224 has the same polarization and rotation as the source light beam 222. The retro-reflected light beam 226 and the transmitted light beam 228 also have linear polarization, but 90° rotation compared to the source light beam 222.

In diagram 200C of FIG. 2C, an additional retarder layer 220 is used on the PBS layer 216 allowing a circularly polarized source light beam 232 to be used with the reflected light beam 234, retro-reflected light beam 236, and the transmitted light beam 238 also being circularly polarized. As an alternative, a simplified configuration similar in complexity to the configurations in FIG. 2A and FIG. 2B may be achieved, for the case of using circular polarization, by use of a PBS layer, which splits orthogonal polarization states by reflecting one circular polarization state and transmitting another circular polarization state orthogonal to the first state such that only one retarder layer is implemented in the system. The single retarder layer may be implemented just before the retro-reflector array in order to form a floating display.

Circularly polarized input light beam 232 may be efficiently reflected (shown as light beam 234) toward the retro-reflective layer 212 by the aligned circular polarization beam splitter layer and converted to linear polarization by the first pass through the quarter-wave retarder layer 214. The linearly polarized and retro-reflected light beam may be converted from linear to circular polarization, which is orthogonal to input state, upon second pass through the quarter-wave retarder layer 214 and reach the PBS layer as light beam 236. The reconvergent light (light beam 236) may transmit through the PBS layer 216 and in this case the optional circular polarizer filter 218 (light beam 238). Films forms of more direct splitting of circular polarization may be used as a separate layer laminated on optically transparent substrate, such as glass or plastic according to some implementations.

The retro-reflective layers may be formed, according to various implementations, using surface metallization, internal or external reflection scenarios, sequence of polymer layers, or optical coatings. For example, a silicon (or other cubic crystalline material) wafer may be processed to include a reflective coated first surface, which in turn may be used as the reflective surface of a retro-reflective array. In another example, a reflective coated second surface may be formed on a processed wafer, where the surface may be laminated or filled with an ultra-violet cure clear resin. A glass, polymer, hardened glass, hard-coat epoxy, or similar material substrate may also be deposited or laminated over the resin. The substrate may be birefringent or not (i.e., coated or laminated with a retarder film), or may include a birefringent layer laminated between the resin fill layer and cover substrate, or a birefringent layer laminated outside the substrate.

Figure 3A:
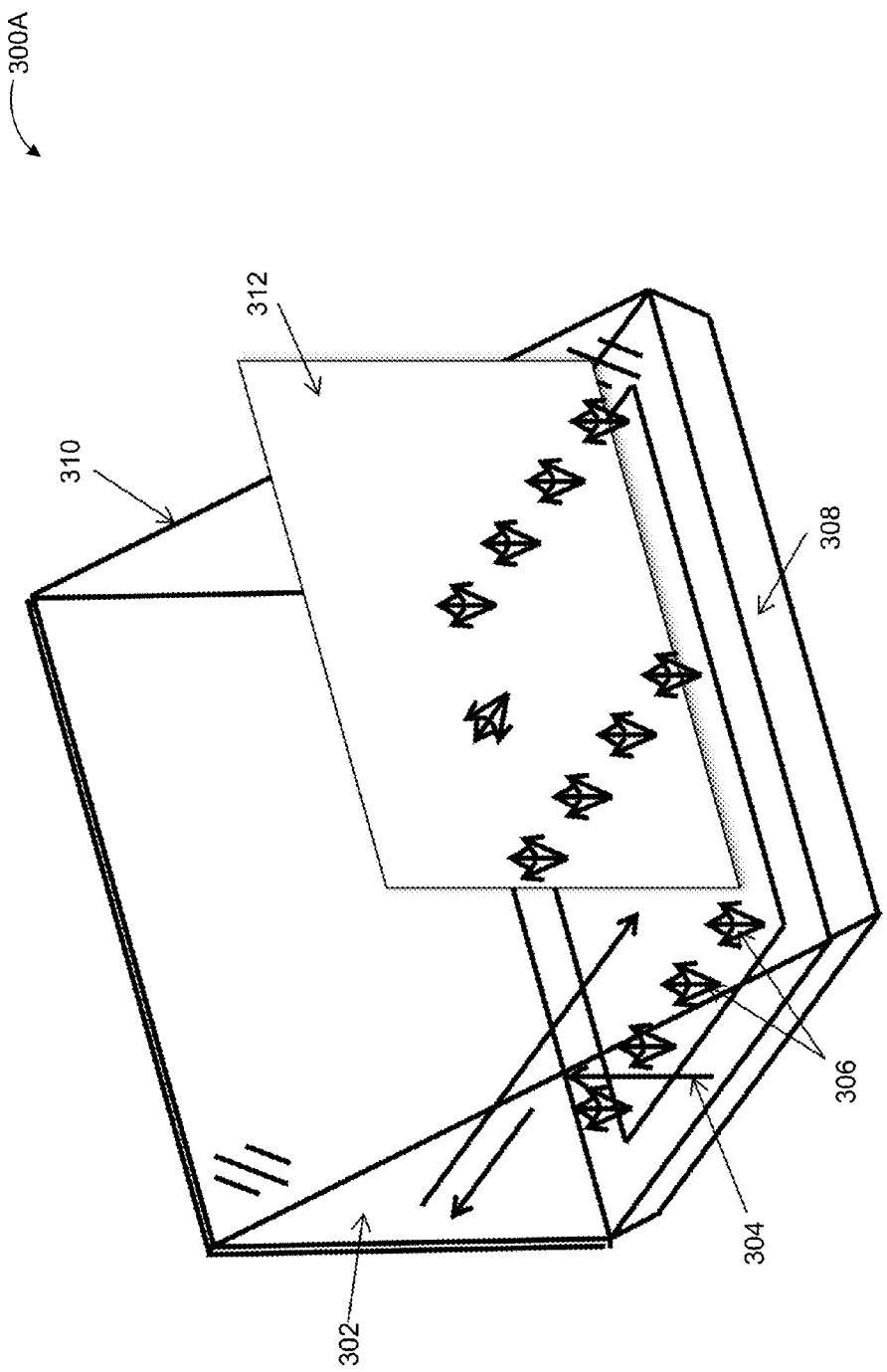
FIG. 3A illustrates an example retro-imaging system configuration with increased efficiency through control of polarization.

FIG. 3A illustrates an example retro-imaging system configuration with increased efficiency through control of polarization.

An example system as shown in diagram 300A may include a display module 308 with a substantially polarized (e.g., linear) light output. The polarized display light 306 may follow the display light path 304 and be reflected toward a retro-reflecting layer 302 with a retarder layer by a polarization beam splitter plate 310 positioned at an angle (e.g., 45°) to the display module plane. The polarization beam splitter plate 310 may have an outboard polarizer filter that efficiently reflects the display light 306. As discussed above, the reflected light may be converted to circular polarization by the retarder layer, retro-reflected, converted back to linear polarization and transmitted through the polarization beam splitter plate 310 to form a floating image 312 if the display light is linearly polarized.

Both metallized and non-metallized retro-reflector surfaces may be used in implementations, however, there may be trade-offs. For the case of metallized coating, the polarization state may be maintained upon reflection, thus enable good control over state, but metallization may cost efficiency in terms of reflectivity of the metal layer. While choice of metal type may reduce loss, there may be feasibility limitations.

By making use of a non-metallized retro-reflector ($2^{nd}$ surface type) with polarized input light, the retarder layer at the retro-reflective layer may have to be present and appropriately oriented in order to avoid or minimize impact on resolve of the reconvergent image. This may be because the relative amount of light intensity within cells that form the retro-reflected image (or 'kites') may vary in many cases, causing diffractive artifacts (which may be predicted by a diffraction model). The diffractive artifacts may cause separation in the point spread function (PSF) of the reconvergent spot or image. Various separation effects may be realized by incorrect orientation of the retarder layer, but a double pass through a quarter-wave retarder oriented at 45°, for linear input case, may address this challenge, and enable full resolution allowed by diffraction to be achieved.

Figure 3B:
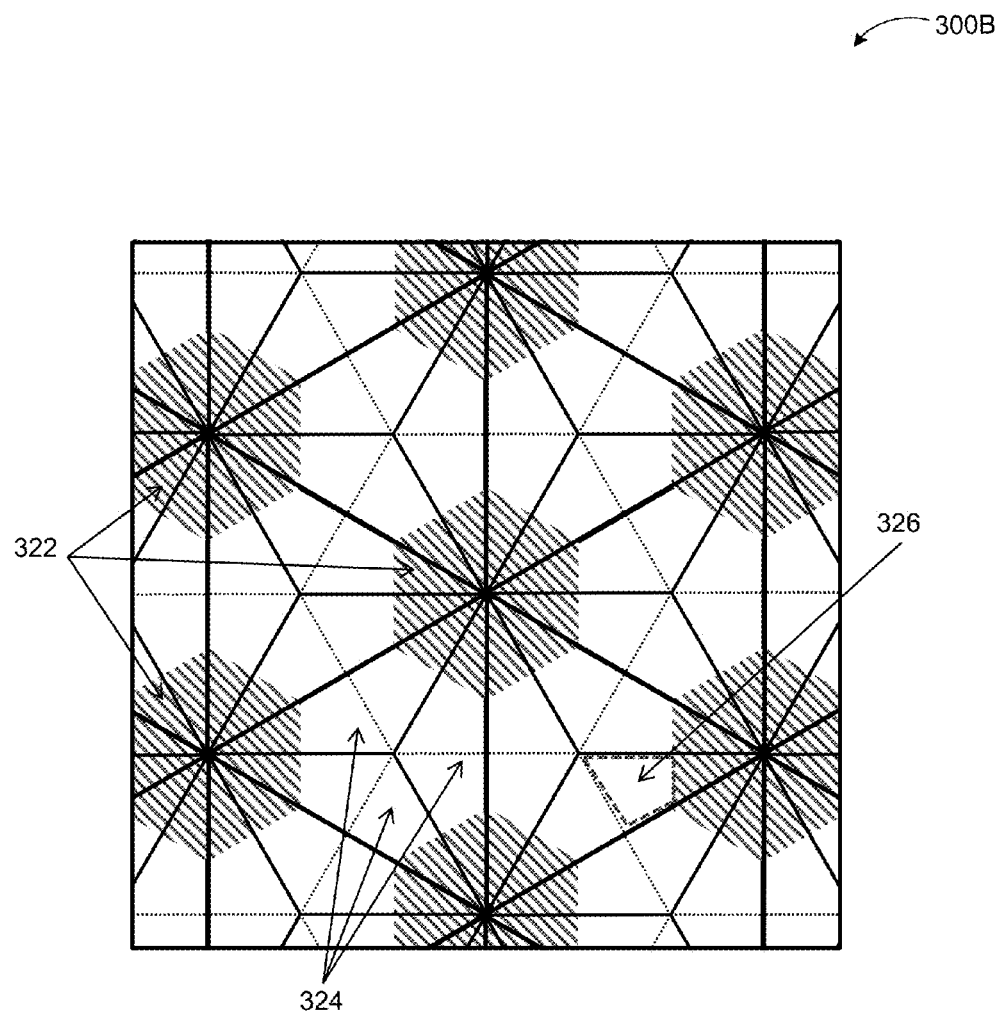
FIG. 3B illustrates a definition of 'kite' tiling in diffraction model for an example case of ruled type retro-reflective film.

FIG. 3B illustrates a definition of 'kite' tiling in diffraction model for an example case of ruled type retro-reflective film.

The reduced resolve due to polarization-induced diffraction is and additional challenge to the loss of resolve caused by facet angle error of the facets within a retro-reflective cell. Even a retro-reflective array comprising facets fabricated at ideal angles, having zero facet angle error, may exhibit strong loss of resolve when polarized light is used without the retardance correction discussed herein. As an example, for the case of a ruled type of retro-reflective array, each retro-reflective cell comprises three facets 324, as illustrated by each solid outlined triangle in diagram 300B. Due to the fabrication method, this type of retro-reflective array may exhibit regions where input light may be reflected off of the three facets, which constitutes regions where input light is retro-reflected. Regions where light is reflected off less than three facets, which appear as dark, 'dead' regions shown by hatched regions 322. Within each hexagonal shaped retro-reflective region within each retro-reflective cell, each of the three facets may exhibit a reflection of the seam between the other two facets, such that the region that is defined by the borders of the reflected seam, an adjacent seam between facets, the edge of cell and the edge of 'dead' zone. These borders define a 'kite' 326, so named due to its shape resembling a kite. There are 6 'kites' within the retro-reflecting region within each retro-reflective cell.

While each 'kite' may include a tilted pointing error due to reflection off facets having facet angle error, and such error may increase angular spread of the reconvergent PSF, additional polarization-induced diffraction artifacts and loss of resolve may be exhibited by usage of polarized input light in conjunction with a non-metallized retro-reflective array. In such scenario of usage, upon input light being retro-reflected, each 'kite' tiling may exhibit different phase shift as well as intensity, which may result in diffraction of feature sizes on order of the 'kite' shape and size, rather than hexagonal shaped retro-reflective region size, thus increasing angular spread by means of polarization-induced diffractive artifacts.

Figure 3C:
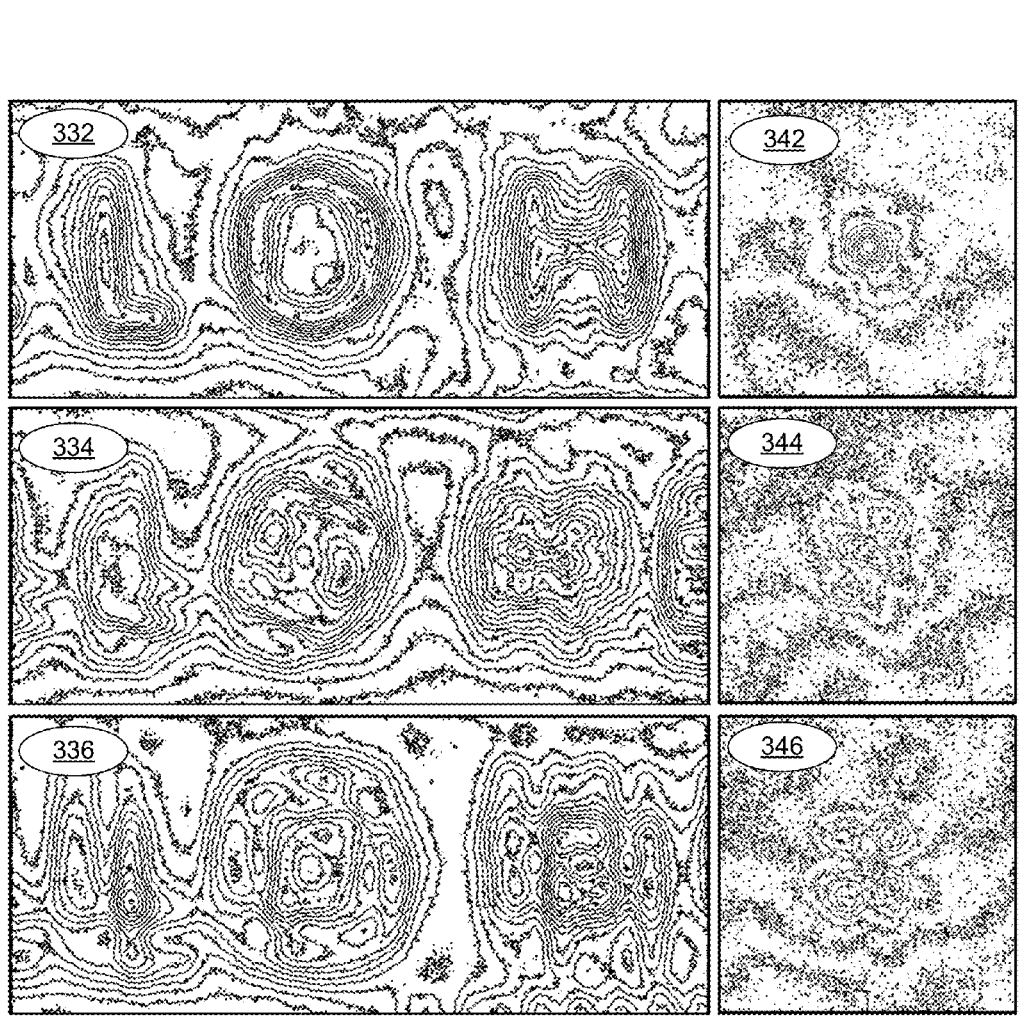
FIG. 3C illustrates example diffractive impacts on resolve when using non-metallized second-surface retro-reflector arrays.

FIG. 3C illustrates example diffractive impacts on resolve when using non-metallized second-surface retro-reflector arrays.

Use of the quarter-wave retarder layer 214 oriented 45° with respect to polarized input light enables both phase and intensity of the output from 'kites' within each cell to be substantially on similar order so as to enable reconstruction of the reconverging image without these added polarization-induced diffractive artifacts. As an example of the significance of impact on resolve, diagram 300C illustrates reconvergent images and PSFs, for the cases of images 332, 334, and 336 of text "L O H" as well as images 342, 344, and 346 of a 'dot' or PSF. Images 332 and 342 represent correction using a quarter-wave retarder layer at about 45° resulting in a reasonable image at the reconvergent plane with substantially maintained resolve. Images 334 and 344 represent about 68° correction with significant impact on resolve. Correction at about 90° (the case of not using retarder layer, or birefringent layer) represented by images 336 and 346 results at substantial loss of resolution.

Figure 3D:
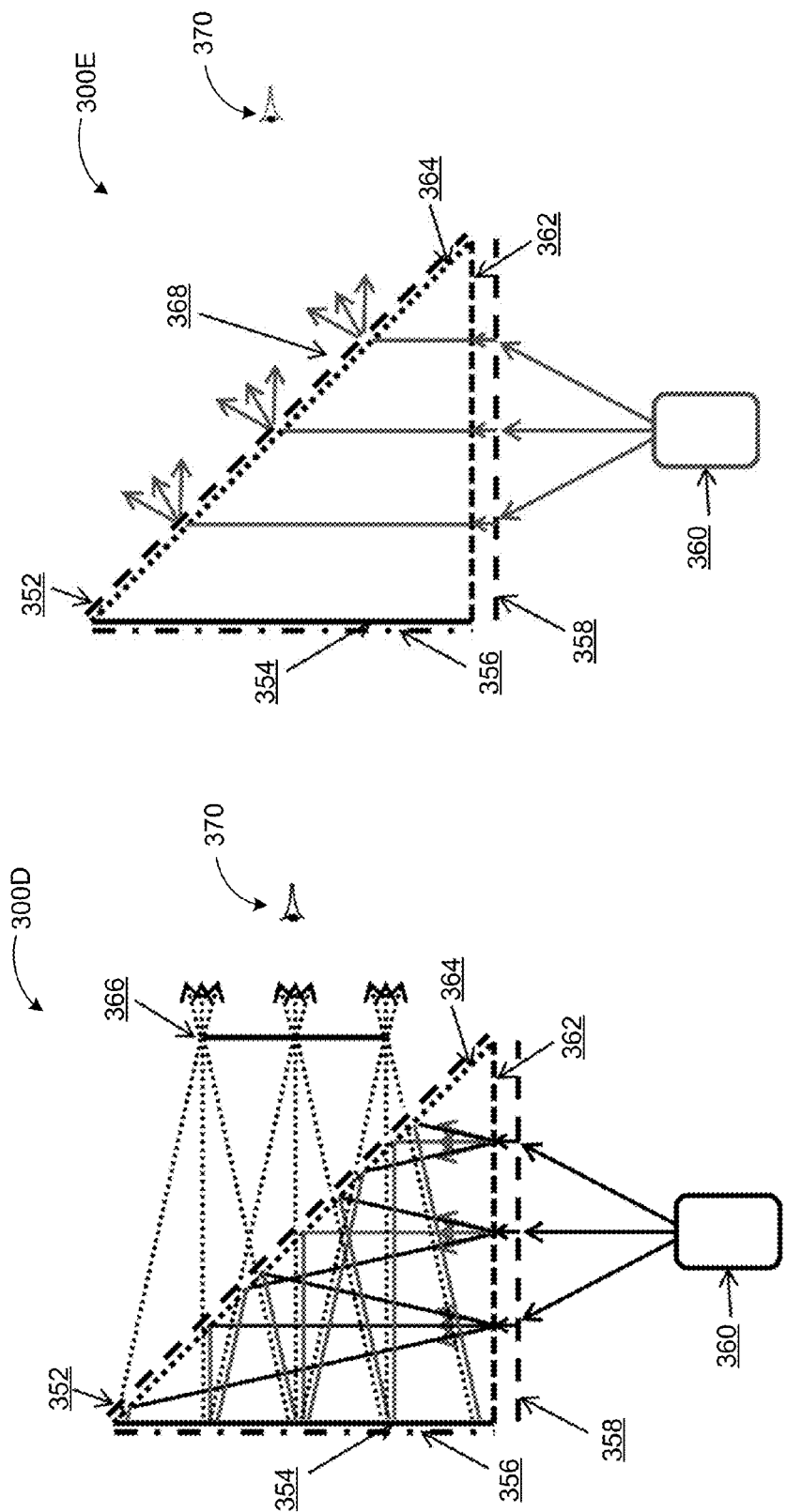
FIG. 3D illustrates floating image and surface image states in a switchable surface and floating display system.

FIG. 3D illustrates floating image and surface image states in a switchable surface and floating display system.

Diagram 300D shows a floating image state of a floating display system, where an image from projector 360 is provided through an optional Fresnel lens 358 to a first switchable diffuser 362 that is in diffuse state. The diffused light is reflected off of the PBS layer 364, which may be at about 45° angle to the first switchable diffuser 362. The reflected light may pass through a retarder layer 354 and reflected back from the retro-reflective layer 356, which may be quarter-wave away from the retarder layer 354. The retro-reflected light may then pass through the PBS layer 364 and a second switchable diffuser 352 (in non-diffuse state) behind the PBS layer 364 forming the floating display image 366 for the viewer's eye 370.

Diagram 300E shows a surface image state of the same floating display system, where an image from projector 360 is provided through the optional Fresnel lens 358 to the first switchable diffuser 362 that is in non-diffuse state. The light passes through the PBS layer 364 and is diffused by the second switchable diffuser 352 in diffuse state forming the surface display image 368 for the viewer's eye 370.

A floating display that hovers over the device may be implemented using a retro-reflector and a polarizing beam splitter to reproduce a display surface, apparently floating in air. Using a pair of switchable diffusers, in conjunction with projected display light having appropriate depth of field such as light content from a projector, a display may be created that has two display surfaces—one flat, physical surface and a second hovering display floating above it, as illustrated in FIG. 3D. Devices like this may be used in situations where use of multi-layer screens may be desired, intuitively mixing a mid-air gesture control with a classic touch gesture control.

Regarding positions of the physical locations of switchable diffusers, at least one below the beam splitter, and one may be on above or directly on top of the splitter. Further, a touch panel (capacitive, resistive, or other type) may be placed as a layer coincident with the physical switchable layer in order to facilitate interaction with both the floating image (3D camera) and touch of the physical layer (touch sensor layer).

Further, while sequential switching of more than two layers may be possible with some trade-off, at least one switchable layer may be located below beam splitter to enable formation of the floating image. Further alternatives may include pixelating the switchable layer(s) such that an addressed content may be selectively chosen to be in diffuse state at a time, thus enabling option of multiple diffuse layers under the splitter, to achieve more than one floating image plane along the z-dimension. Switchable diffuser layer may include use of any switchable diffuser type, including PDLC (polymer dispersed liquid crystal), PNLC (polymer network liquid crystal), and comparable ones.

Other forms of switchable diffusing, which may be sensitive to or more maintaining of polarization state, may include use of a switchable rotator layer(s) in conjunction with a passive microlens array having liquid crystal such that orthogonal states may provide scattering vs no scattering. In that respect, one option may include timing between switchable diffuser layers being switched by input polarization state, and use of polarization rotator below first layer, such that switching of polarization state may diffuse first layer (floating) and switch of state may all light to pass first layer and project on physical second layer, which would have a diffuse state aligned to the orthogonal second polarization state, thus enabling switching in a fashion having sensitivity to polarization.

In either case of switchable diffuser layers, more than one layer below splitter may be used to enable more than one floating image layer along z-dimension, and also some cases may employ pixelating the switchable diffuser layers, making them addressable by content.

The projector may be operated at 120 Hz, for example, and project alternately a first and second video stream. The first diffuser may be synchronized with the first interleaved video stream, which for example shows an application window. This may become the floating image, and may be manipulated using gestures. The second diffuser may be synchronized with the second interleaved video stream, which for example may be a desktop, and can be interacted with using touch. The user may see the gesture-application window floating in front of the touch-desktop.

In some implementations, a floating display that hovers over the computing device may be implemented using a retro-reflector and beam-splitter to reproduce a display surface, apparently floating in air. The users may interact with the floating display using a gesture sensor. Devices like this may be used in situations where contact with the display surface is undesirable, such as physical games and public kiosks.

Figure 4:
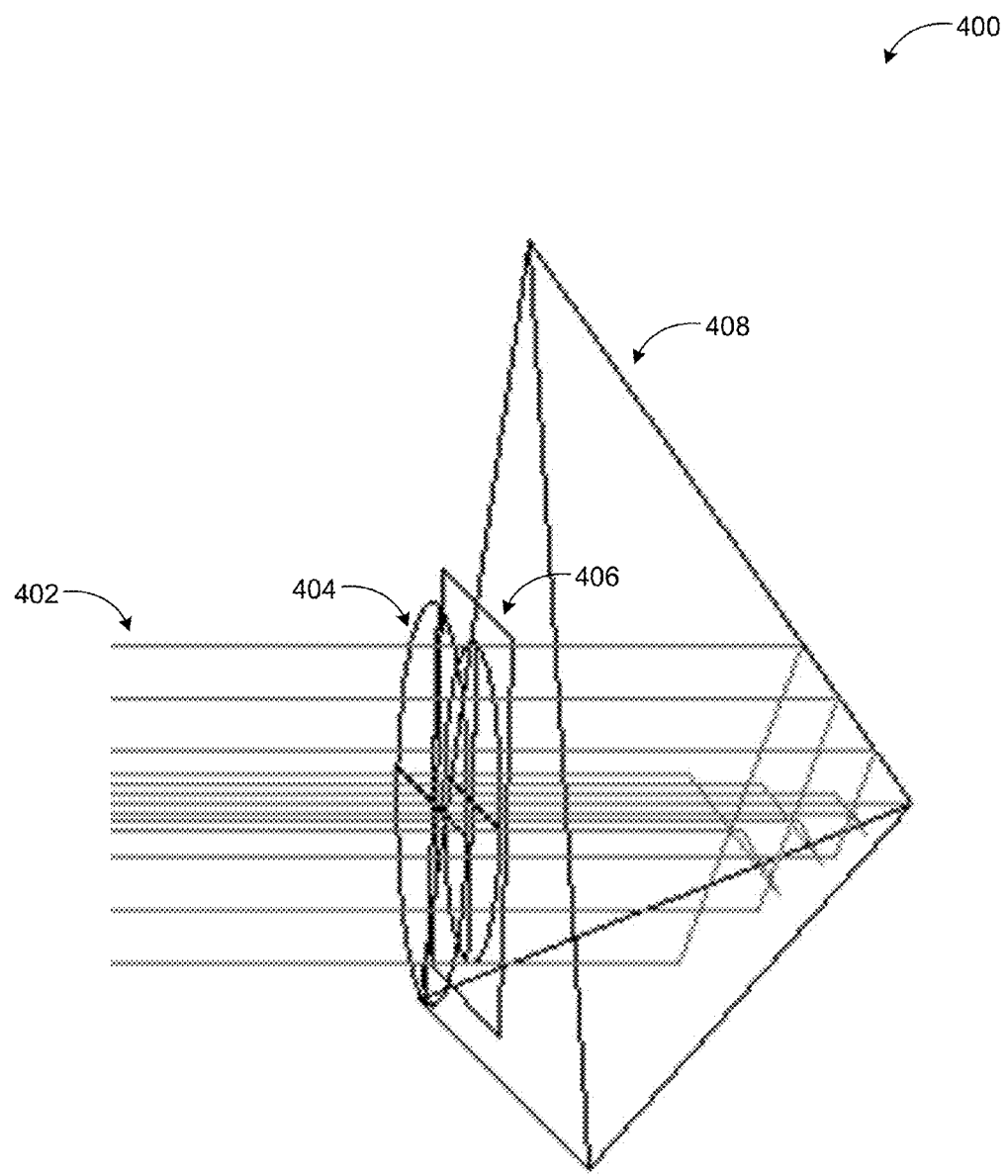
FIG. 4 illustrates an in-cell look at output versus input polarization in a corner cube configuration.
Figure 5A:
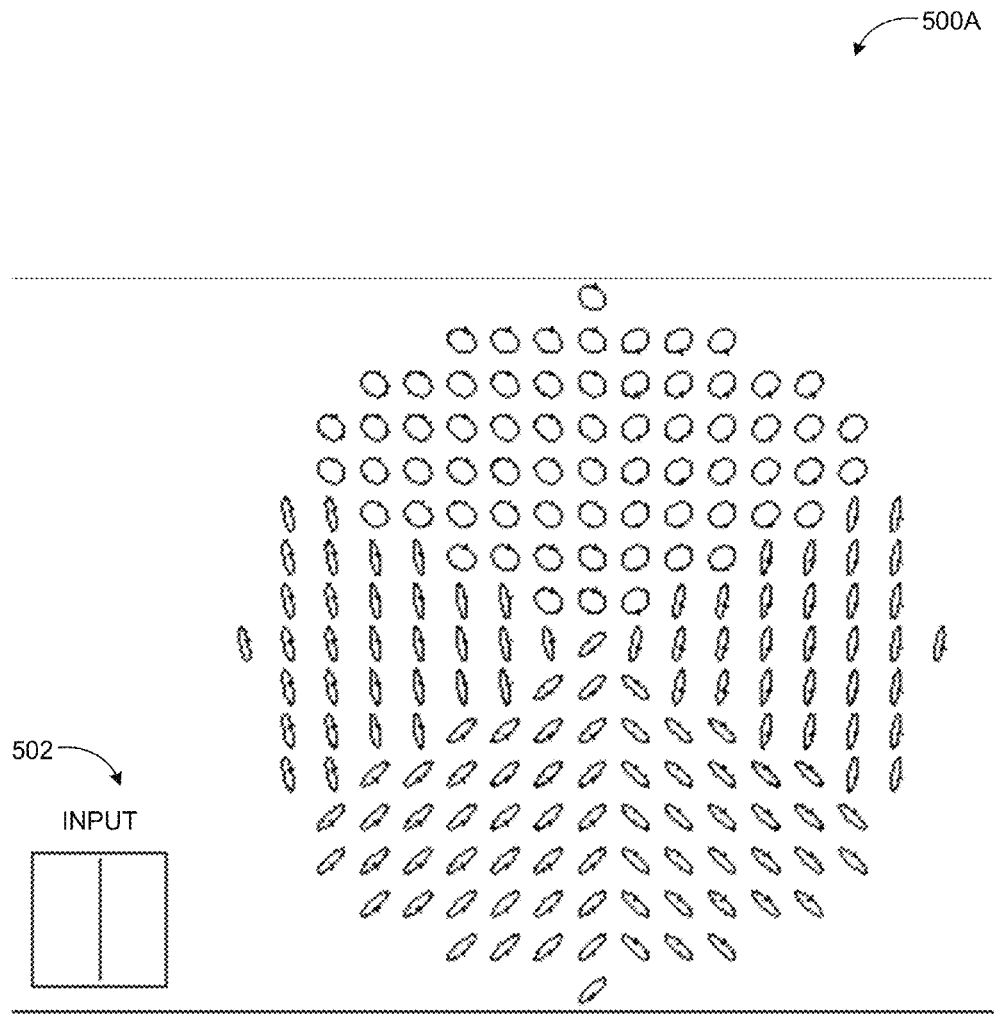
FIGS. 5A through 5I illustrate example polarization pupil maps for different inputs in the example configuration of FIG. 4, for case of using a non-metallized retro-reflector array.
Figure 5B:
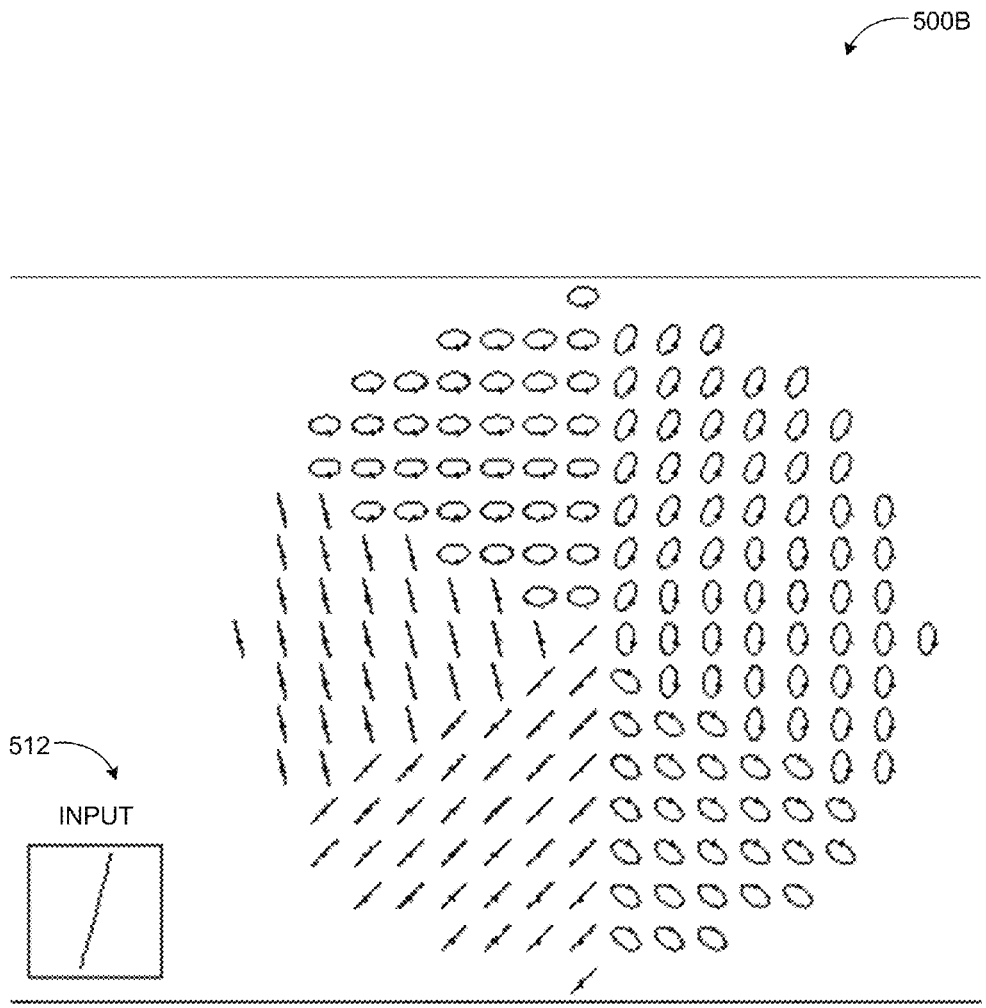
Figure 5C:
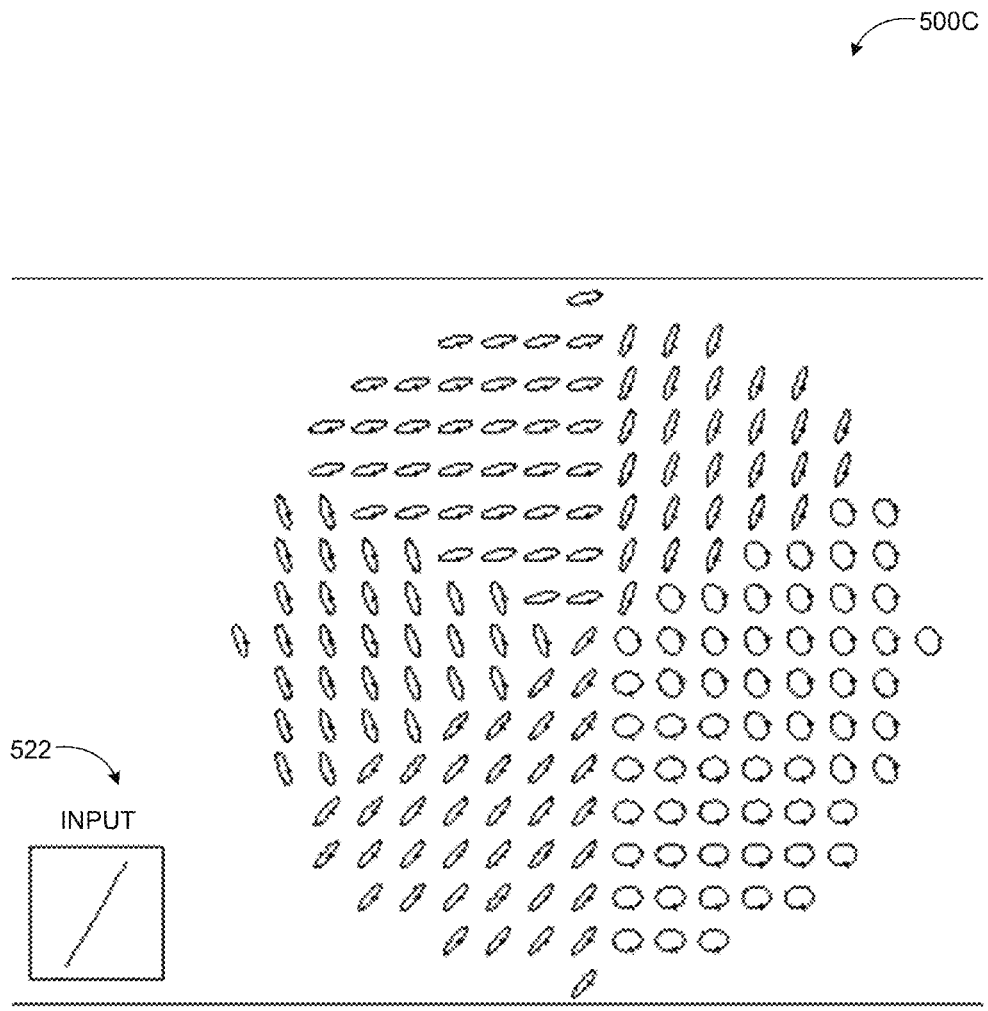
Figure 5D:
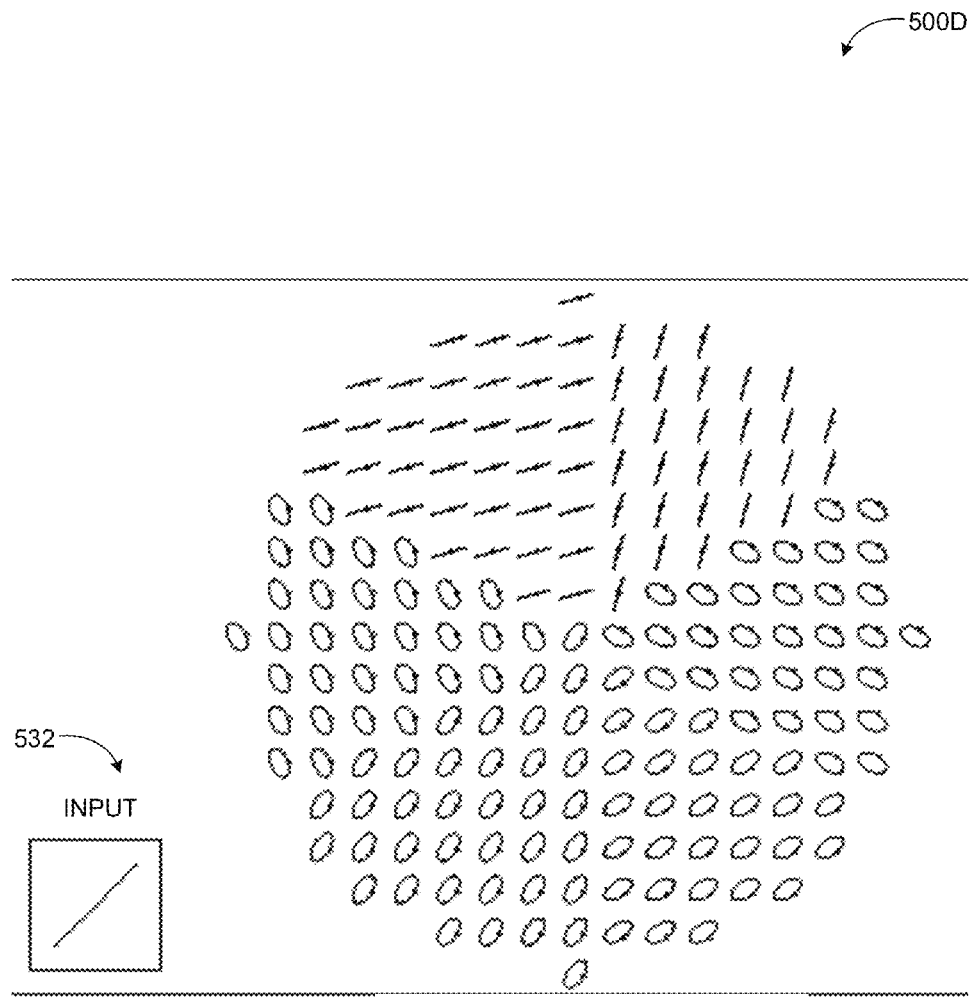
Figure 5E:
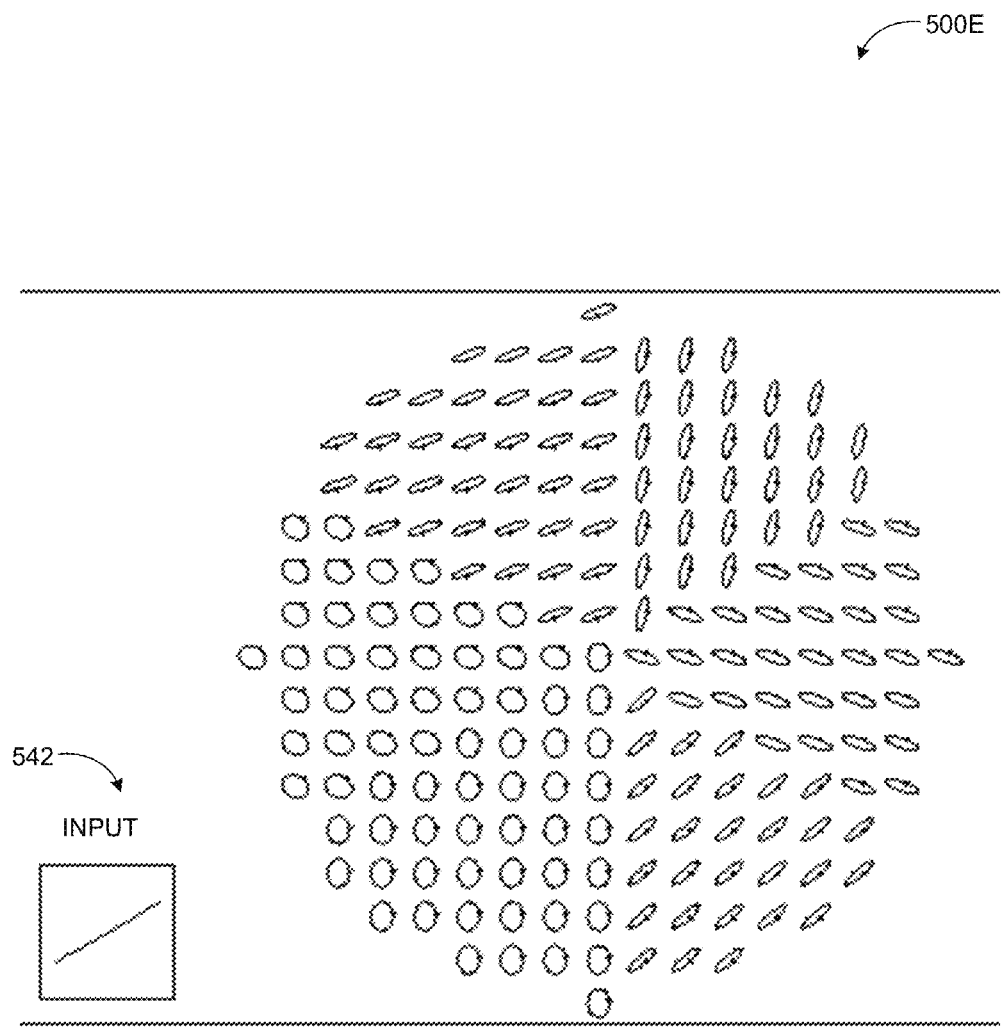
Figure 5F:
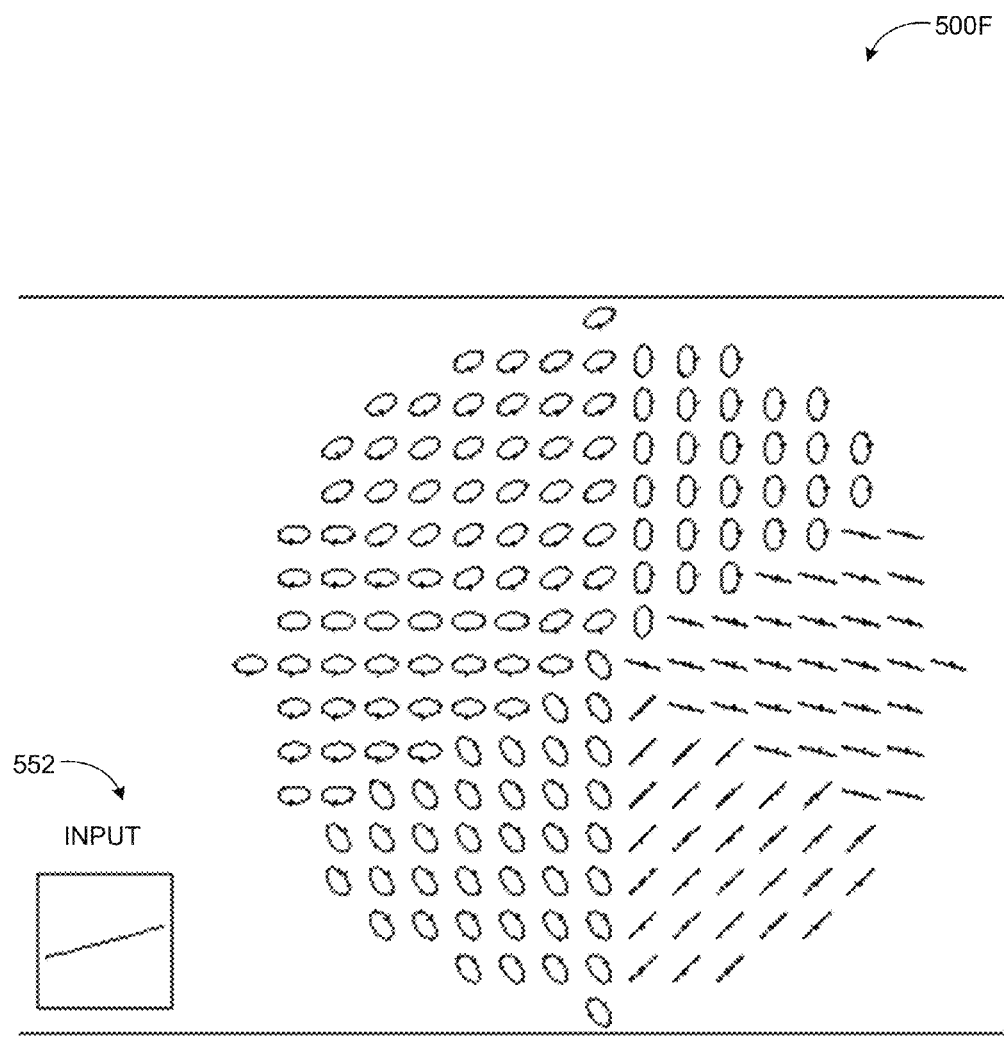
Figure 5G:
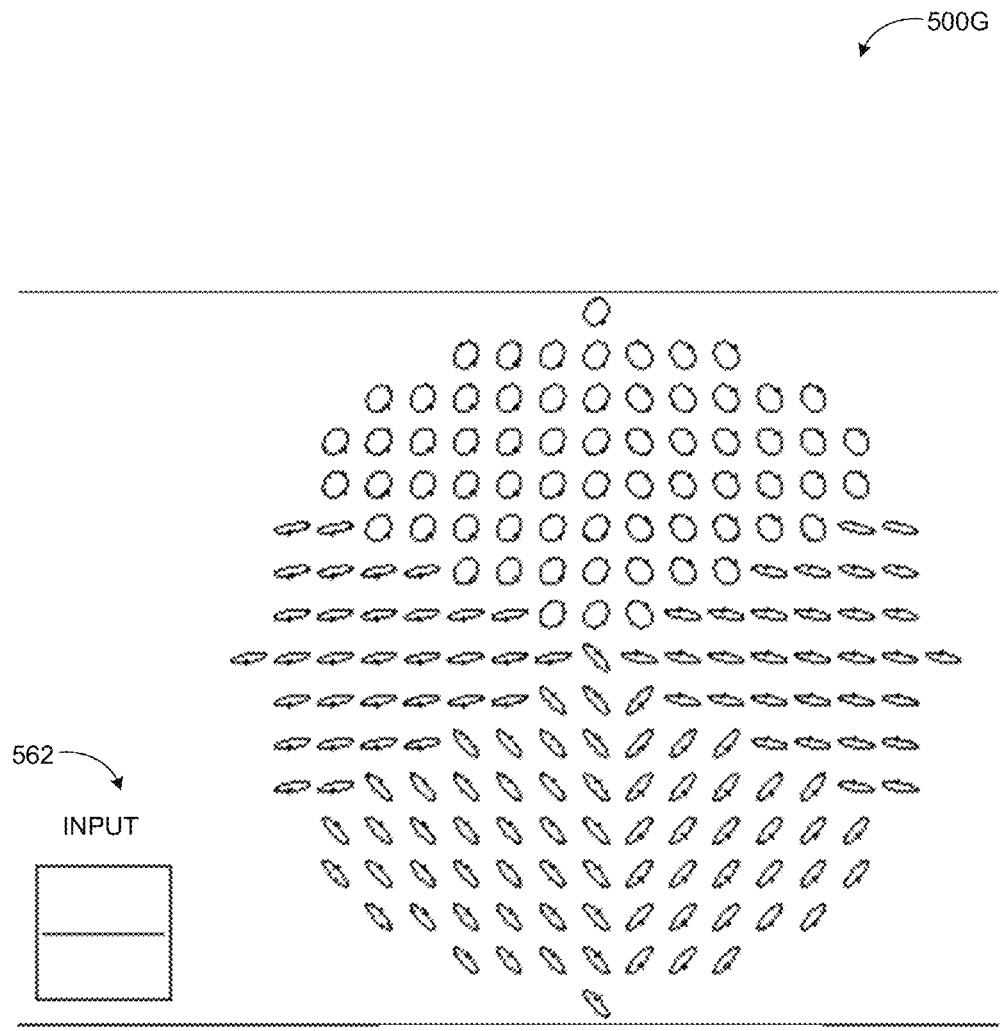
Figure 5H:
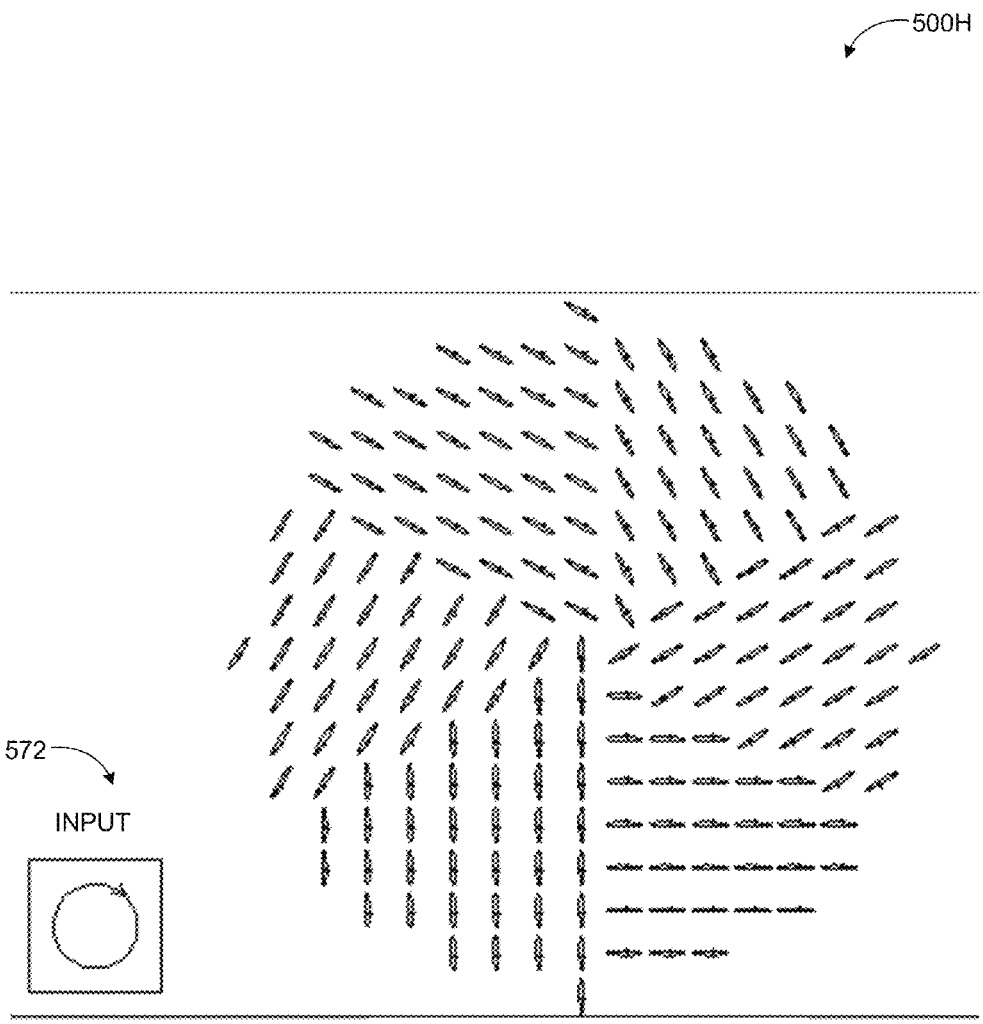
Figure 5I:
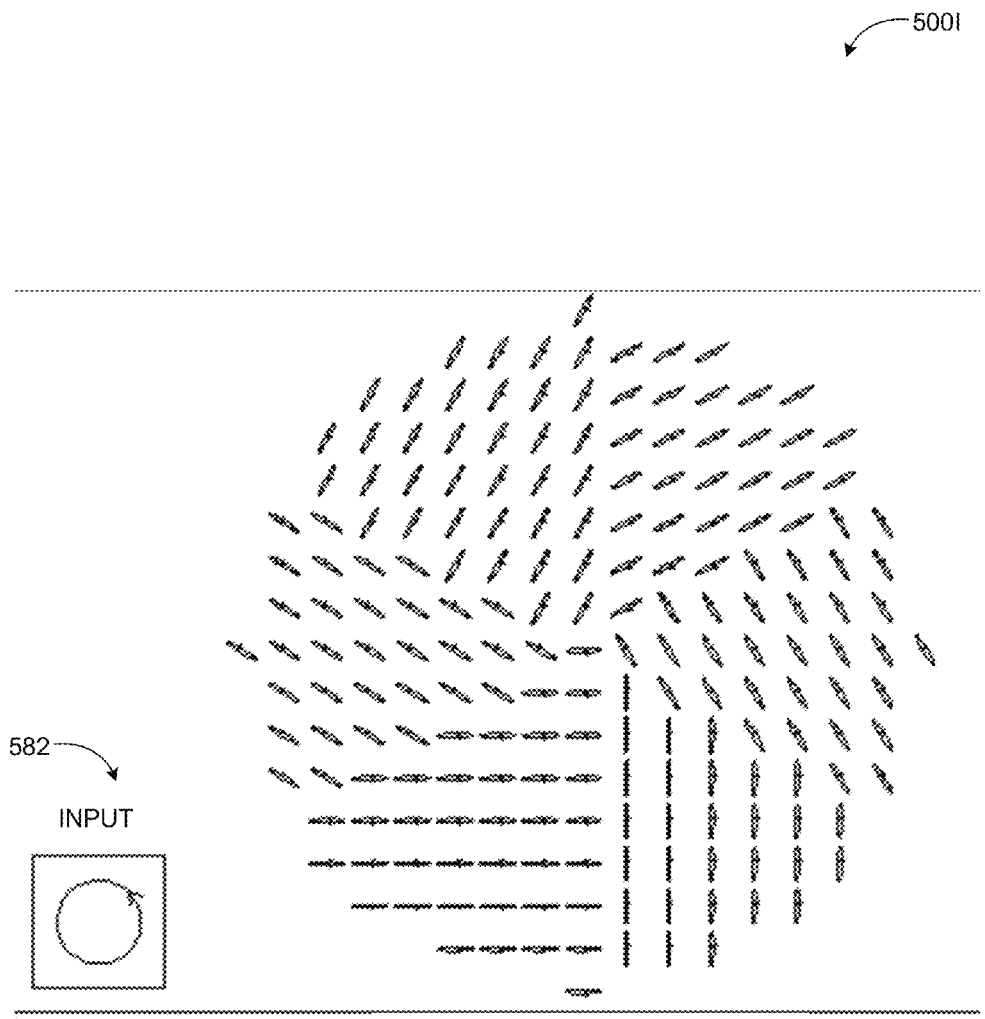

FIG. 4 illustrates an in-cell look at output versus input polarization in a corner cube configuration.

Diagram 400 shows an example corner cube reflector 408 with incoming and reflected light 402 passing through a polarization beam splitter 406 and a polarizer filter 404 once on the way in to the reflector and once on the way out. The effects of the reflection and pass-through through the PBS (and polarizer filter) on polarized input light are shown in FIGS. 5A through 5I.

FIGS. 5A through 5I illustrate example polarization pupil maps for different inputs in the example configuration of FIG. 4.

Diagrams 500A through 500G show polarization distribution of an output light beam through a retro-reflector system as described herein for various linear input light polarizations such as vertical polarization 502, horizontal polarization 562, and various angles between those two (input polarizations 512, 522, 532, 542, and 552).

Diagrams 500H and 500I show polarization distribution of an output light beam through a retro-reflector system as described herein for circular input light polarizations in opposite directions (input polarizations 572 and 582).

Figure 6:
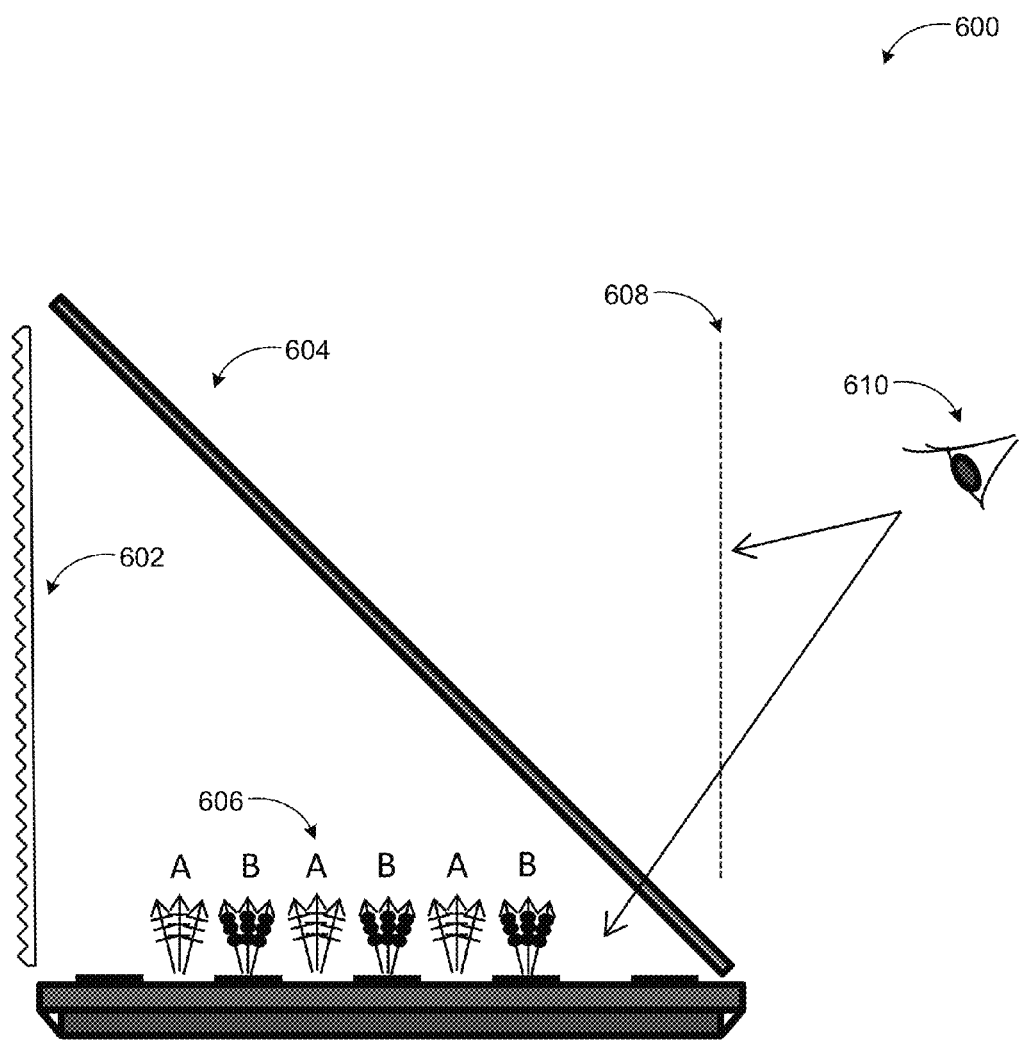
FIG. 6 illustrates an example dual image content generation from one display using retarder-based stereo 3D-type LCD modules.

FIG. 6 illustrates an example dual image content generation from one display using retarder-based stereo 3D-type LCD modules.

As shown in diagram 600, a viewer's eye 610 may see floating image 582 from a pixel set (606 A) having one state of polarization, and see a direct display from another set of pixels (606 B) having opposite polarization. The orthogonal A-B states from passive polarization-may be used to generate a stereo display (linear or circular+retarder) in a system configuration that includes the retro-reflective layer with a retarder 602 and PBS layer 604.

For case of a display having circularly polarized light output, another retarder layer may be added over the display to convert the light to linear polarization as input to the PBS. Reflection from the retro-reflector may rotate to orthogonal state, thus an applied (double-pass) retardance may cause light from the reflector to efficiently pass the PBS on second pass. As mentioned previously, a 'cholesteric' circular polarizing film may also be used as PBS layer, so that only a single retarder layer is needed for the circular polarization case.

Retro-reflective imaging systems with polarization and diffractive artifact resolution control as described herein may allow enhanced efficiency in retro-reflective imaging systems, thereby enabling use of such systems in various applications. Furthermore, orthogonal polarization states at source display may be used to achieve simultaneous viewing of both floating image and direct view of display panel.

The examples in FIGS. 1 through 6 have been described with specific systems including specific apparatuses, components, component configurations, and component tasks. Implementations are not limited to systems according to these example configurations. Retro-reflective imaging systems with polarization and diffractive artifact resolution control may be implemented in configurations using other types of systems including specific apparatuses, components, component configurations, and component tasks in a similar manner using the principles described herein.

Figure 7:
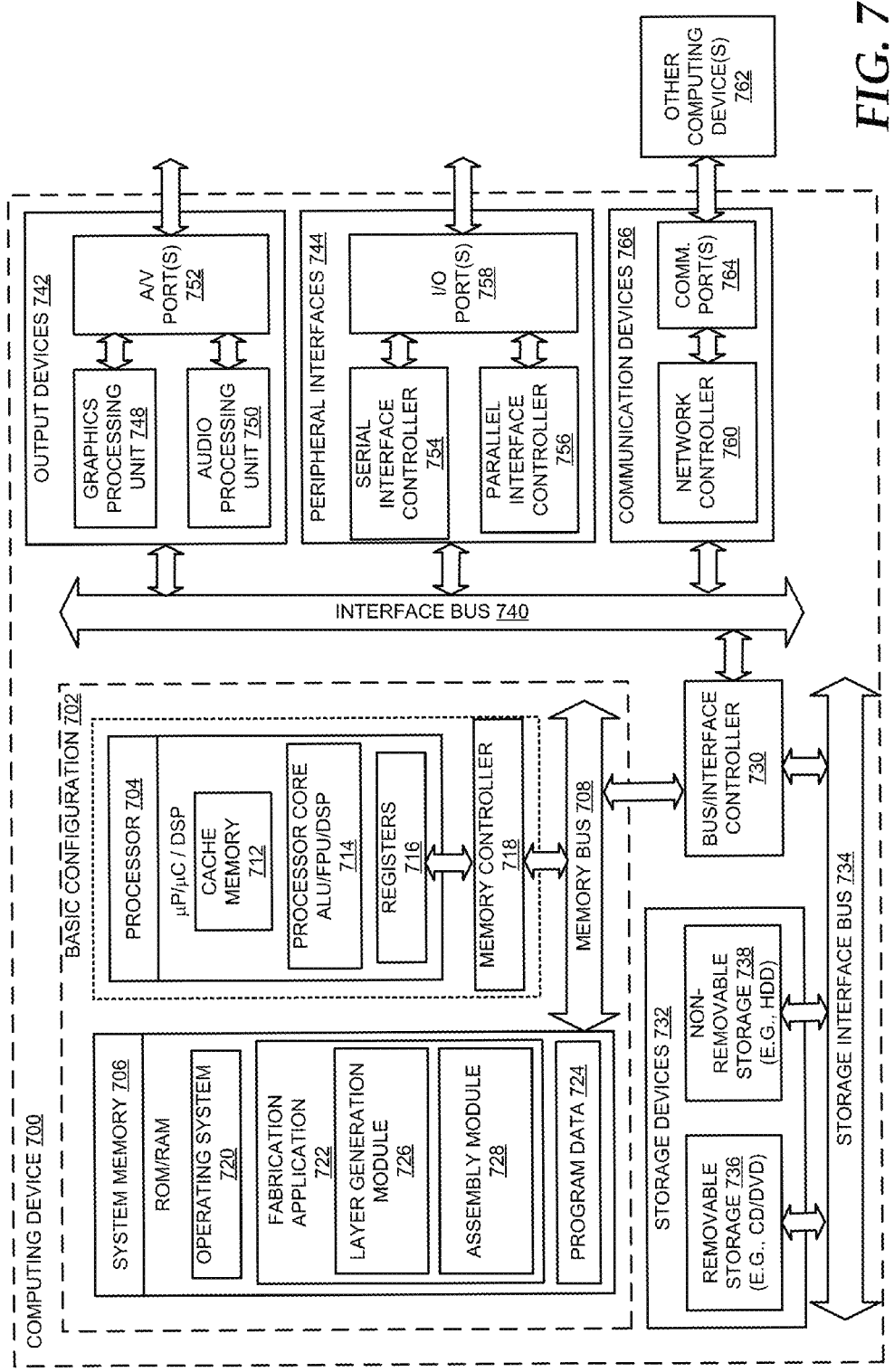
FIG. 7 is a block diagram of an example computing device that may be used to control a fabrication system for retro-reflective imaging systems with polarization and diffractive artifact resolution control.

FIG. 7 is a block diagram of an example computing device that may be used to control a fabrication system for retro-reflective imaging systems with polarization and diffractive artifact resolution control.

For example, the computing device 700 may be used in conjunction with a fabrication system for retro-reflective imaging systems with polarization and diffractive artifact resolution control described herein. In an example of a basic configuration 702, the computing device 700 may include one or more processors 704 and a system memory 706. A memory bus 708 may be used for communication between the processor 704 and the system memory 706. The basic configuration 702 may be illustrated in FIG. 7 by those components within the inner dashed line.

Depending on the desired configuration, the processor 704 may be of any type, including, but not limited to, a microprocessor (µP), a microcontroller (µC), a digital signal processor (DSP), or any combination thereof. The processor 704 may include one more levels of caching, such as a level cache memory 712, a processor core 714, and registers 716. The processor core 714 may include an arithmetic logic unit (ALU), a floating point unit (FPU), a digital signal processing core (DSP Core), or any combination thereof. A memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720 suitable for controlling the operation of the platform, such as the WINDOWS®, WINDOWS MOBILE®, WINDOWS RT®, or WINDOWS PHONE®, and similar operating systems from MICROSOFT CORPORATION of Redmond, Wash. The system memory 706 may further include a fabrication application 722, a layer generation module 726, an assembly module 728, and a program data 724. The fabrication application 722 may control various aspects of retro-reflective system fabrication such as forming of polarization beam splitter layers and retarder layers, which may be placed in front of the retro-reflector arrays and oriented such that when polarized light is used as source, source input light is efficiently reflected at the polarization beam splitter layers toward the retro-reflective layers, and polarization is converted to circular upon first pass through retarder layers.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736, and the non-removable storage devices 738 may be examples of computer storage media. Computer storage media may include, but may not be limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 766) to the basic configuration 702 via the bus/interface controller 730. Some of the example output devices 742 may include a graphics processing unit 748 and an audio processing unit 750, which may be configured to communicate to various external devices, such as a display or speakers via one or more A/V ports 752. One or more example peripheral interfaces 744 may include a serial interface controller 754 or a parallel interface controller 756, which may be configured to communicate with external devices, such as input devices (for example, keyboard, mouse, pen, voice input device, touch input device, etc.) or other peripheral devices (for example, printer, scanner, etc.) via one or more I/O ports 758. An example communication device 766 may include a network controller 760, which may be arranged to facilitate communications with one or more other computing devices 762 over a network communication link via one or more communication ports 764. The one or more other computing devices 762 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example implementations also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program. Alternatively or additional, components or steps described with respect to computing device 700 may be located or performed in a networked computer in a cloud-computing environment, for example, a data center.

Figure 8:
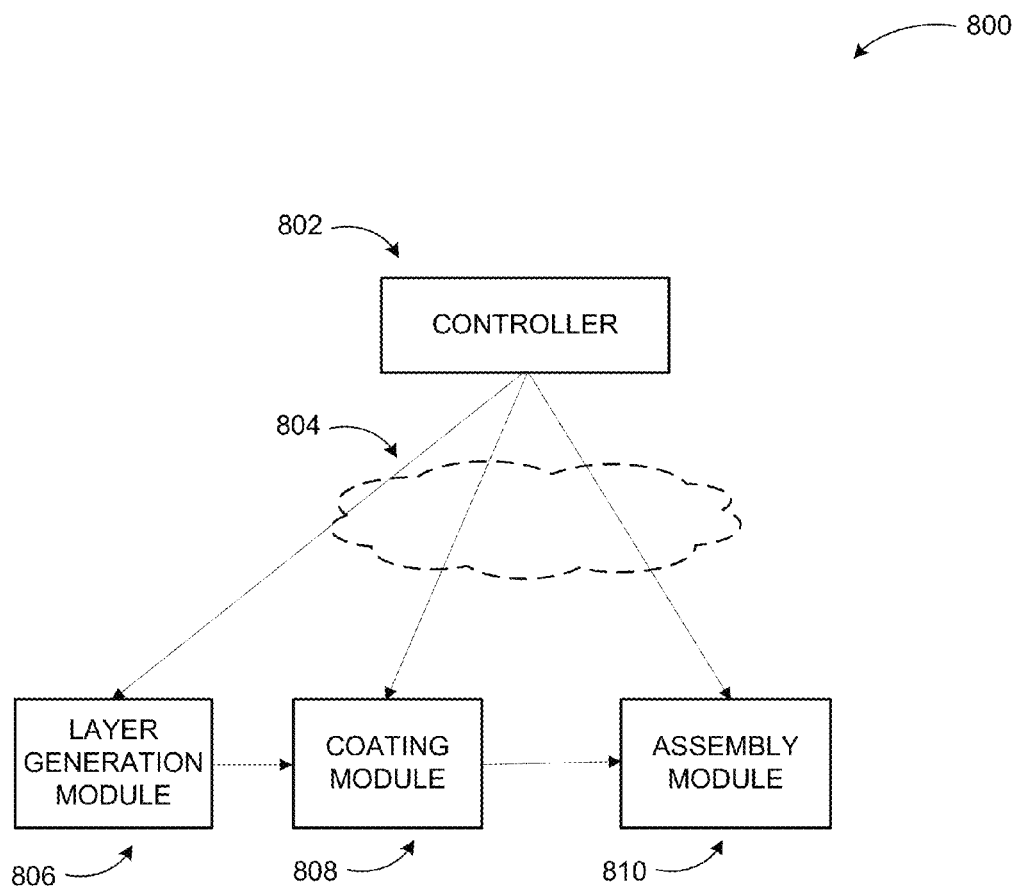
FIG. 8 illustrates an example retro-reflective imaging device fabrication system according to implementations.

FIG. 8 illustrates an example retro-reflective imaging device fabrication system according to implementations.

According to some implementations, a fabrication system for retro-reflective imaging systems with polarization and diffractive artifact resolution control may include a layer generation module 806, a coating module 808, and an assembly module 810. A controller 803 may control and coordinate the actions of the various fabrication modules through wired or wireless communication with the modules, for example, over the cloud 804.

The layer generation module 806 may be configured to form the various layers of a polarization controlled retro-reflective display system such as the reflective layer, the PBS layer, and the retarder layer(s). The reflective layer may be formed as a corner cube array (CCA), for example, which may be metallized or non-metallized, coated or uncoated. Various replication, lamination, molding, cutting, and sizing (e.g., milling, grinding, polishing, and electron discharge machining (EDM)) may be employed in the formation of the various layers along with use of suitable materials.

The coating module 808 may be configured to apply different coatings to enhance reflectivity, reliability, and accuracy of the reflective layer and/or the PBS layer. Other fabrication techniques for forming the layers, for example, the reflective layer may include, but are not limited to, epitaxial growth, vapor selective epitaxial growth, induction heating, flash steam heating and cooling fluids.

Figure 9:
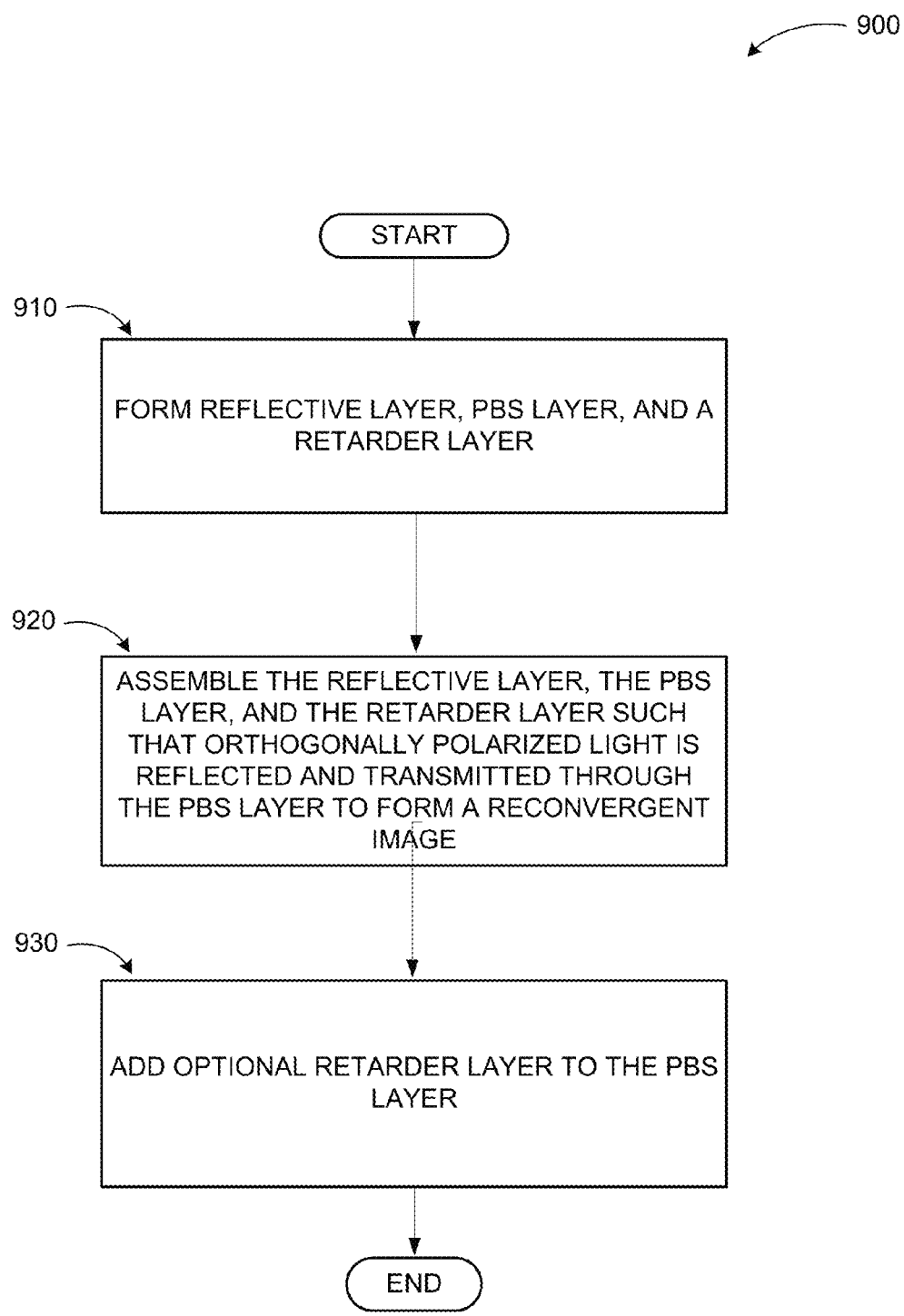
FIG. 9 illustrates a logic flow diagram of a method to fabricate retro-reflective imaging systems with polarization and diffractive artifact resolution control, according to implementations.

FIG. 9 illustrates a logic flow diagram of a method to fabricate retro-reflective imaging systems with polarization and diffractive artifact resolution control, according to implementations. Process 900 may be implemented on a controller of a fabrication system such as computing device 700, for example.

Process 900 begins with operation 910, where a reflective layer (e.g., a corner cube array "CCA" retor-reflective array), a PBS layer, and one or more retarder layers are formed.

At operation 920 following operation 910, the formed layers may be assembled such that orthogonally (linear or circular) polarized source light is transmitted through the PBS layer to form a floating, reconvergent image. For example, the reflective layer may be positioned substantially perpendicularly to the light source and the PBS layer may be positioned at or near 45° with respect to the reflective layer and the light source. A retarder layer may also be attached to an inward facing surface of the reflective layer such that linearly polarized source light is reflected from the PBS layer to the reflective surface, then reflected in orthogonal polarization toward the PBS layer and transmitted through the PBS layer to form the floating image. Similarly, orthogonal phases of circularly polarized light may also be reflected to form a reconvergent image as discussed previously.

At operation 930 following operation 920, a second retarder layer may be attached or formed on an inward facing surface of the PBS layer such that circularly polarized source light that is reflected from the reflective layer is transmitted through the PBS layer to form the reconvergent image. Alternatively, a film or layer may be used, which may directly reflect or transmit light based on orthogonal circular polarization states. Thus, a system similar to that formed at operation 920 may be used with such a film as beam splitter and by adding a retarder layer to enable transmission upon second pass at PBS layer.

The operations included in process 900 are for illustration purposes. Providing retro-reflective imaging systems with polarization and diffractive artifact resolution control may be implemented by similar processes with fewer or additional steps, as well as in different order of operations using the principles described herein.

According to some examples, a retro-reflective display may include a reflective layer at a substantially perpendicular position to a light source and a polarizing beam splitter (PBS) layer positioned such that a polarized source light from the light source is reflected from the PBS layer to the reflective layer and a reflected light from the reflective layer with orthogonal polarization to the source light is transmitted through the PBS layer to form a reconvergent image.

According to other examples, the PBS layer may be positioned at or near 45° with respect to the light source and the reflective layer. The retro-reflective display may further include a retarder layer formed on an inward facing surface of the reflective layer facing the PBS layer. The retarder layer may be a quarter-wave retarder layer that is angularly oriented within a plane of the retarder layer such that a fast axis is about 45° with respect to a polarization of linearly polarized input light. The retro-reflective display may also include a polarizer filter formed on an outward facing surface of the PBS layer.

According to further examples, the retro-reflective display may further include another retarder layer formed on an inward facing surface of the PBS layer opposite the polarizer filter such that a circularly polarized source light is received as a circularly polarized reflected light from the reflective surface and transmitted as linearly polarized light through the PBS layer. The retro-reflective display may also include a polarizer formed on the light source to convert a randomly polarized source light to a linearly polarized source light.

According to yet other examples, the reflective surface may be a retro-reflective array. The retro-reflective array may be coated or uncoated and metalized or non-metalized. The PBS layer may be configured to split orthogonal polarization states of circularly polarized input light by reflecting a first circular polarization state and transmitting a second circular polarization state orthogonal to the first circular polarization state such that only one retarder layer is implemented in the retro-reflective display.

According to other examples, a display system may include one or more light sources; a reflective layer at a substantially perpendicular position to the one or more light sources; and a polarizing beam splitter (PBS) layer positioned at or near 45° with respect to the one or more light sources and the reflective layer. Source light from the one or more light sources may be transmitted at two orthogonal polarizations, a portion of the source light polarized in one of the orthogonal polarizations may be reflected from the PBS layer to the reflective layer to the reflective layer and a reflected light from the reflective layer may be transmitted through the PBS layer to form a reconvergent image. Another portion of the source light polarized in another one of the orthogonal polarizations may be transmitted directly through the PBS layer such that a stereo image is generated.

According to some examples, the source light from the one or more light sources may be transmitted at two orthogonal polarizations through a pair of switchable diffusers such that two display surfaces are created, a first display surface corresponding to a physical surface and a second display surface corresponding to a hovering image floating above the physical surface. A first switchable diffuser may be positioned below the PBS layer and a second switchable diffuser may be positioned at or over an outward surface of the PBS layer.

According to yet other examples, the system may include a touch-detection layer coincident with the first switchable diffuser to facilitate interaction with the floating image and the physical surface. The system may also include at least a third switchable diffuser positioned below the PBS layer to facilitate multiple floating images on distinct image planes. The switchable diffusers may be made from one of PDLC (polymer dispersed liquid crystal), PNLC (polymer network liquid crystal). The system may also include one or more switchable rotator layers and a passive microlens array having liquid crystal such that selected orthogonal polarization states provide scattering. One or both of the reflective layer and the PBS layer include an inward retarder layer.

According to further examples, a polarization controlled retro-reflective display fabrication system may include a layer generation module configured to generate one or more of a retro-reflective layer, a retarder layer, and a polarizes beam splitter (PBS) layer; a coating module configured to apply reflective coating to the retro-reflective layer; and an assembly module configured to assemble the retro-reflective layer, the PBS layer, and one or more retarder layers such that a polarized source light from a light source is reflected from the PBS layer to the reflective layer and a reflected light from the reflective layer with orthogonal polarization to the source light is transmitted through the PBS layer to form a reconvergent image. The fabrication system may also include a controller configured to coordinate one or more operations of the layer generation module, the coating module, and the assembly module.

According to some examples, the retro-reflective layer may be a corner cube array (CCA) and the layer generation module may be configured to generate a reflective surface covering facets of a plurality of corner cube structures of the CCA through reflective coating directly applied to the facets of the plurality of corner cube structures; reflective coating applied over a replicated retro-reflective array; or the facets of the plurality of corner cube structure rendered reflective through total internal reflection (TIR).

According to some examples, a means to fabricate a polarization controlled retro-reflective display may include a layer generation means configured to generate one or more of a retro-reflective layer, a retarder layer, and a polarizes beam splitter (PBS) layer; a coating means configured to apply reflective coating to the retro-reflective layer; and an assembly means configured to assemble the retro-reflective layer, the PBS layer, and one or more retarder layers such that a polarized source light from a light source is reflected from the PBS layer to the reflective layer and a reflected light from the reflective layer with orthogonal polarization to the source light is transmitted through the PBS layer to form a reconvergent image. The fabrication means may also include a control means configured to coordinate one or more operations of the layer generation module, the coating module, and the assembly module.

The above specification, examples and data provide a complete description of the manufacture and use of the composition of the implementations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and implementations.

The foregoing detailed description has set forth various implementations of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof, as understood by a person having ordinary skill in the art. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the implementations disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of the disclosure.

What is claimed is:

1. A retro-reflective display comprising:
   a retro-reflective layer at a substantially perpendicular position to a light source; and
   a polarizing beam splitter (PBS) layer positioned such that a polarized source light from the light source is reflected from the PBS layer to the retro-reflective layer and a reflected light from the retro-reflective layer with orthogonal polarization to the source light is transmitted through the PBS layer to form a reconvergent image, and wherein a surface of the retro-reflective layer is laminated or filled with an ultra-violet cure clear resin.

2. The retro-reflective display of claim 1, wherein the PBS layer is positioned at or near 45° with respect to the light source and the retro-reflective layer.

3. The retro-reflective display of claim 1, further comprising a retarder layer formed on an inward facing, surface of the reflective layer facing the PBS layer.

4. The retro-reflective display of claim 3, wherein the retarder layer is a quarter-wave retarder layer that is angularly oriented within a plane of the retarder layer such that a fast axis is about 45° with respect to a polarization of linearly polarized input light.

5. The retro-reflective display of claim 1, further comprising a polarizer filter formed on an outward facing surface of the PBS layer.

6. The retro-reflective display of claim 5, further comprising another retarder layer formed on an inward facing surface of the PBS layer opposite the polarizer filter such that a circularly polarized source light is received as a circularly polarized reflected light from the reflective surface and transmitted as linearly polarized light through the PBS layer.

7. The retro-reflective display of claim 1, wherein the retro-reflective surface is a retro-reflective array.

8. The retro-reflective display of claim 7, wherein the retro-reflective array is one of coated or uncoated and metalized or non-metalized.

9. The retro-reflective display of claim 1, wherein the PBS layer is configured to split orthogonal polarization states of circularly polarized input light by reflecting a first circular polarization state and transmitting a second circular polarization state orthogonal to the first circular polarization state such that only, one retarder layer is implemented in the retro-reflective display.

10. The retro-reflective display of claim 1, wherein the retro-reflective layer is formed using one or more of: surface metallization, sequence of polymer layers, or optical coatings.

11. The retro-reflective display of claim 7, wherein the retro-reflective array includes a plurality of corner, cube arrays (CCAs).

12. The retro-reflective display of claim 11, wherein a reflective coating is directly applied to facets of a plurality of corner cube structures of the CCAs.

13. The retro-reflective display of claim 12, wherein the facets of the plurality of corner cube structures are rendered reflective through total internal reflection (TIR).

* * * * *